United States Patent
Fukutomi et al.

(10) Patent No.: US 12,404,428 B2
(45) Date of Patent: Sep. 2, 2025

(54) RADIATION-CURABLE ADHESIVE SHEET

(71) Applicant: NITTO DENKO CORPORATION, Ibaraki (JP)

(72) Inventors: Shuhei Fukutomi, Ibaraki (JP); Hirofumi Katami, Ibaraki (JP); Shinya Yamamoto, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/284,135

(22) PCT Filed: Mar. 24, 2022

(86) PCT No.: PCT/JP2022/014047
§ 371 (c)(1),
(2) Date: Sep. 26, 2023

(87) PCT Pub. No.: WO2022/210277
PCT Pub. Date: Oct. 6, 2022

(65) Prior Publication Data
US 2024/0182756 A1    Jun. 6, 2024

(30) Foreign Application Priority Data
Mar. 30, 2021    (JP) ................................ 2021-058810

(51) Int. Cl.
*C09J 7/38*      (2018.01)
*C09J 11/06*     (2006.01)
*C09J 133/14*    (2006.01)

(52) U.S. Cl.
CPC .............. *C09J 7/385* (2018.01); *C09J 11/06* (2013.01); *C09J 133/14* (2013.01)

(58) Field of Classification Search
None
See application file for complete search history.

(56) References Cited

FOREIGN PATENT DOCUMENTS

| CN | 106543907 A | 3/2017 |
|---|---|---|
| CN | 106752992 A | 5/2017 |
| CN | 109796880 A | 5/2019 |

(Continued)

OTHER PUBLICATIONS

JP2020118918A Machine Translation via EPO (Year: 2020).*

(Continued)

*Primary Examiner* — Laura C Powers
(74) *Attorney, Agent, or Firm* — Sughrue Mion, PLLC

(57) ABSTRACT

A radiation curable pressure-sensitive adhesive sheet 1 of the present invention has a pressure-sensitive adhesive layer 10 that is cured by irradiation with radiation. The pressure-sensitive adhesive layer 10 contains a photopolymerization initiator 11a and a crosslinking agent 11b, and the curing by irradiation with radiation is curing by a reaction between the photopolymerization initiator 11a and the crosslinking agent 11b. In the radiation curable pressure-sensitive adhesive sheet 1 of the present invention, when the pressure-sensitive adhesive layer 10 is stored at 50° C. for 4 weeks, a rate of change in residual stress (N/cm²) expressed by the following equation is 70% or less.

Residual stress change rate (%)=(residual stress after storage at 50° C. for 4 weeks−initial residual stress)/(initial residual stress)×100

14 Claims, 4 Drawing Sheets

(56) References Cited

FOREIGN PATENT DOCUMENTS

| | | |
|---|---|---|
| JP | 2009-161603 A | 7/2009 |
| JP | 2016-155981 A | 9/2016 |
| JP | 2017-155213 A | 9/2017 |
| JP | 2019-131679 A | 8/2019 |
| JP | 2020-111628 A | 7/2020 |
| JP | 2020-118918 A | 8/2020 |
| JP | 2020-186312 A | 11/2020 |
| WO | 2016/117045 A1 | 7/2016 |
| WO | 2016/170875 A1 | 10/2016 |

OTHER PUBLICATIONS

International Search Report dated Jun. 7, 2022 in Application No. PCT/JP2022/014047.
Written Opinion of International Searching Authority dated Oct. 3, 2023 in Application No. PCT/JP2022/014047.
Notice of Reasons for Refusal dated Oct. 29, 2024 from the Japanese Patent Office in Application No. 2021-058810.
Extended European Search Report issued Feb. 24, 2025 in Application No. 22780491.1.
Communication issued Mar. 18, 2025 in Japanese Application No. 2021-058810.

* cited by examiner

RADIATION-CURABLE ADHESIVE SHEET

CROSS REFERENCE TO RELATED APPLICATIONS

This application is a National Stage of International Application No. PCT/JP2022/014047 filed Mar. 24, 2022, claiming priority based on Japanese Patent Application No. 2021-058810 filed Mar. 30, 2021.

TECHNICAL FIELD

The present invention relates to a radiation curable pressure-sensitive adhesive sheet. In particular, the present invention relates to a radiation curable pressure-sensitive adhesive sheet that can be used for bonding a transparent optical element to another optical element.

BACKGROUND ART

An image display device, such as a liquid crystal display device or an organic EL display device, is composed of an optical element laminate in which one of various types of transparent optical elements, such as a polarizing film, a retardation film, and a transparent cover element including a cover glass, is laminated. A pressure-sensitive adhesive sheet comprising a transparent pressure-sensitive adhesive layer is used for bonding these optical elements to each other. In other words, a pressure-sensitive adhesive sheet is disposed between two optical elements to be bonded together, and then the two optical elements are pressed against each other, so that they are bonded together through the pressure-sensitive adhesive sheet to form an optical element laminate. A pressure-sensitive adhesive sheet provided with the pressure-sensitive adhesive layer on one side of a substrate film is generally used in production processes of an optical product as a surface protective film to prevent scratches or adherence of stain on the optical element.

For example, in an image display device equipped with an input device such as a touch panel, a transparent electro-conductive printed layer, such as a patterned ITO (Indium Tin Oxide) layer, is formed on a surface of an optical element. Silver or copper lead wiring is further formed in the peripheral portion. In addition, a black concealing portion is generally printed in a frame shape in the peripheral edge portion of the transparent cover element. A pressure-sensitive adhesive sheet to which an optical element having such a printed layer and wiring is bonded is required to increase the fluidity of the pressure-sensitive adhesive layer to exhibit level difference absorbability such that no bubbles are left in the stepped space. In addition, when optical elements with printed stepped spaces are laminated together via a pressure-sensitive adhesive sheet, there is a problem that display unevenness is likely to occur in a peripheral edge portion of an image display panel due to stress strain or the like applied to the pressure-sensitive adhesive around the printed stepped spaces, and thus excellent stress relaxation properties are also required.

On the other hand, a plastic film or the like used as an optical element contains a gas such as carbon dioxide, and gas may be generated under high-temperature conditions in the production process. At this point, when the pressure-sensitive adhesive layer is soft, the gas generation cannot be suppressed enough, and the pressure-sensitive adhesive layer is floated, thus causing a problem that bubbles are likely to be formed. Therefore, in order to suppress the gas generation from the plastic film, the pressure-sensitive adhesive sheet is required to have a high elastic modulus of the pressure-sensitive adhesive layer and be hard to enhance adhesive reliability.

A pressure-sensitive adhesive sheet having a pressure-sensitive adhesive layer that is cured by irradiation with radiation (sometimes referred to herein as "radiation curable pressure-sensitive adhesive sheet") is widely used as a pressure-sensitive adhesive sheet exhibiting all of above level difference absorbability, stress relaxation properties, and adhesive reliability (see, for example, Patent Literature 1). The radiation curable pressure-sensitive adhesive sheet has the advantage that, before curing, the sheet can be made to have high fluidity and excellent level difference absorbability and stress relaxation properties to sufficiently follow the stepped space and reduce stress strain caused by the stepped space to suppress display unevenness, and then irradiation with radiation completes the curing process to improve adhesive reliability.

CITATION LIST

Patent Literature

Patent Literature 1: International Publication No. WO 2016/170875

SUMMARY OF INVENTION

Technical Problem

Although the radiation curable pressure-sensitive adhesive sheet may be shipped as an pressure-sensitive adhesive sheet containing a photopolymerization initiator and a cross-linking agent and stored for a relatively long period of time, there has been a problem that curing gradually proceeds during storage due to environmental factors such as heat and light, resulting in deterioration of level difference absorbability and stress relaxation properties as well as generation of bubbles and display unevenness.

The present invention has been made under the circumstances described above, and an object thereof is to provide a radiation curable pressure-sensitive adhesive sheet with excellent storage stability, which can suppress the progress of curing during storage and maintain excellent level difference absorbability and stress relaxation properties for a long time.

Solution to Problems

As a result of intensive studies to achieve the object, the present inventors have found that a radiation curable pressure-sensitive adhesive sheet can suppress the progress of curing during storage, can maintain excellent level difference absorbability and stress relaxation properties for a long time, and has excellent storage stability by including a photopolymerization initiator exhibiting a pKa within a specific range as the photopolymerization initiator contained in the radiation curable pressure-sensitive adhesive sheet. The present invention has been completed based on these findings.

In other words, the first aspect of the present invention provides a radiation curable pressure-sensitive adhesive sheet. The radiation curable pressure-sensitive adhesive sheet according to the first aspect of the present invention has a pressure-sensitive adhesive layer that is cured by irradiation with radiation, wherein: the pressure-sensitive adhesive layer contains a photopolymerization initiator and a crosslinking agent; and the curing by irradiation with radiation is curing by a reaction between the photopolymerization initiator and the crosslinking agent. In the radiation curable pressure-sensitive adhesive sheet according to the first aspect of the present invention, the pressure-sensitive adhesive layer is in a state of high fluidity, excellent level difference absorbability, and excellent stress relaxation properties before curing. Therefore, the pressure-sensitive adhesive layer can sufficiently follow a stepped space of a transparent electroconductive printed layer, such as a patterned ITO, formed on a surface of an optical element, silver or copper lead wiring, and a black concealing portion formed in a frame shape in a peripheral edge portion of a transparent cover element to be filled without bubbles remaining or gaps and can reduce stress strain caused by the stepped space to suppress display unevenness. The pressure-sensitive adhesive layer has the advantage that curing proceeds upon subsequent irradiation with radiation by a reaction between the photopolymerization initiator and the crosslinking agent contained in pressure-sensitive adhesive layer, thereby improving adhesive reliability.

In the radiation curable pressure-sensitive adhesive sheet according to the first aspect of the present invention, when the pressure-sensitive adhesive layer is stored at 50° C. for 4 weeks, the rate of change in residual stress (N/cm$^2$) (hereinafter, sometimes referred to herein simply as "residual stress change rate") expressed by the following equation is 70% or less.

Residual stress change rate (%)=(residual stress after storage at 50° C. for 4 weeks−initial residual stress)/(initial residual stress)×100

When the radiation curable pressure-sensitive adhesive sheet is stored for a relatively long period of time, there is a problem that curing by a reaction of a photopolymerization initiator or a crosslinking agent contained in the pressure-sensitive adhesive layer gradually proceeds due to an environmental factor such as heat or light, resulting in deterioration of level difference absorbability and stress relaxation properties. The configuration in which the residual stress change rate is 70% or less is suitable in terms of being able to suppress the progress of curing of the pressure-sensitive adhesive layer during storage of the radiation curable pressure-sensitive adhesive sheet according to the first aspect of the present invention, being able to maintain excellent level difference absorbability and stress relaxation properties for a long time, and having excellent storage stability.

In the radiation curable pressure-sensitive adhesive sheet according to the first aspect of the present invention, in terms of being able to suppress the progress of curing of the pressure-sensitive adhesive layer during storage, being able to maintain excellent level difference absorbability and stress relaxation properties for a long time, and having excellent storage stability, the residual stress change rate is preferably 60% or less and more preferably 55% or less, and may be 50% or less, 45% or less, 40% or less, 35% or less, or 30% or less.

Advantageous Effects of Invention

A radiation curable pressure-sensitive adhesive sheet of the present invention can suppress the progress of curing during storage and maintain excellent level difference absorbability and stress relaxation properties for a long time, and has excellent storage stability.

BRIEF DESCRIPTION OF DRAWINGS

FIGS. 2 a)-2(e) illustrate a process for implementing one embodiment of a method for producing a radiation curable pressure-sensitive adhesive sheet according to the present invention, in which

DESCRIPTION OF EMBODIMENTS

Figure 1:
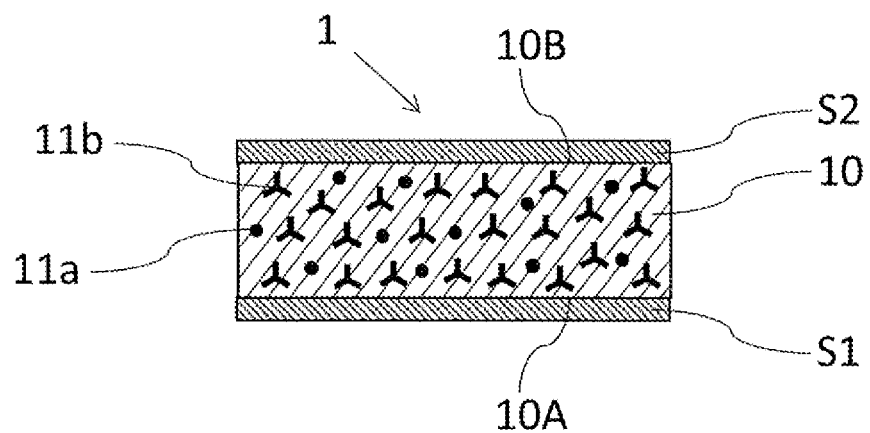
FIG. 1 is a cross-sectional view illustrating one embodiment of a radiation curable pressure-sensitive adhesive sheet according to the present invention.

The first aspect of the present invention provides a radiation curable pressure-sensitive adhesive sheet having a pressure-sensitive adhesive layer that is cured by irradiation with radiation. The pressure-sensitive adhesive layer contains a photopolymerization initiator and a crosslinking agent, and the curing by irradiation with radiation is curing by a reaction between the photopolymerization initiator and the crosslinking agent. When the pressure-sensitive adhesive layer is stored at 50° C. for 4 weeks, the rate of change in residual stress (N/cm$^2$) (hereinafter, sometimes referred to herein simply as "residual stress change rate") expressed by the following equation is 70% or less.

Residual stress change rate (%)=(residual stress after storage at 50° C. for 4 weeks−initial residual stress)/(initial residual stress)×100

Hereinafter, in the present specification, the radiation curable pressure-sensitive adhesive sheet according to the first aspect of the present invention is sometimes referred to as "radiation curable pressure-sensitive adhesive sheet of the present invention" or simply as "pressure-sensitive adhesive sheet of the present invention". The pressure-sensitive adhesive layer of the radiation curable pressure-sensitive adhesive sheet of the present invention is sometimes referred to as "pressure-sensitive adhesive layer of the present invention", and the photopolymerization initiator and the crosslinking agent contained in the pressure-sensitive adhesive layer of the present invention are sometimes referred to as "photopolymerization initiator of the present invention" and "crosslinking agent of the present invention", respectively.

The form of the radiation curable pressure-sensitive adhesive sheet of the present invention is not particularly limited as long as the adhesive face is an adhesive face (pressure-sensitive adhesive layer surface) of the pressure-sensitive adhesive layer of the present invention. For example, the pressure-sensitive adhesive sheet may be a single-coated pressure-sensitive adhesive sheet having a pressure-sensitive adhesive surface on only one side thereof or a double-coated pressure-sensitive adhesive sheet having pressure-sensitive adhesive surfaces on both sides thereof. In addition, when the radiation curable pressure-sensitive adhesive sheet of the present invention is a double-coated pressure-sensitive adhesive sheet, the radiation curable pressure-sensitive adhesive sheet of the present invention may have a form in which both pressure-sensitive adhesive surfaces are provided by the pressure-sensitive adhesive layer of the present invention or may have a form in which one adhesive face is provided by the pressure-sensitive adhesive layer of the present invention while the other adhesive face is provided by a pressure-sensitive adhesive layer other than the pressure-sensitive adhesive layer of the present invention (other pressure-sensitive adhesive layer). From the viewpoint of laminating objects together, a double-coated pressure-sensitive adhesive sheet is preferable.

The radiation curable pressure-sensitive adhesive sheet of the present invention may be a so-called "substrate-less type" of pressure-sensitive adhesive sheet having no substrate (substrate layer) or a type of a pressure-sensitive adhesive sheet having a substrate. Note that in the present specification, the "substrate-less type" of the pressure-sensitive adhesive sheet is sometimes referred to as a "substrate-less pressure-sensitive adhesive sheet", and the type of the pressure-sensitive adhesive sheet having a substrate is sometimes referred to as a "substrate-attached pressure-sensitive adhesive sheet". Examples of the above substrate-less pressure-sensitive adhesive sheet include a double-coated pressure-sensitive adhesive sheet composed only of the pressure-sensitive adhesive layer of the present invention and a double-coated pressure-sensitive adhesive sheet composed of the pressure-sensitive adhesive layer of the present invention and another pressure-sensitive adhesive layer (pressure-sensitive adhesive layer other than the pressure-sensitive adhesive layer of the present invention). Examples of the above substrate-attached pressure-sensitive adhesive sheet include a single-coated pressure-sensitive adhesive sheet having the pressure-sensitive adhesive layer of the present invention on one side of a substrate, a double-coated pressure-sensitive adhesive sheet having the pressure-sensitive adhesive layer of the present invention on both sides of a substrate, and a double-coated pressure-sensitive adhesive sheet having the pressure-sensitive adhesive layer of the present invention on one side of a substrate and another pressure-sensitive adhesive layer on the other side. Note that the above "substrate (substrate layer)" refers to a support, which is a portion to be laminated to an object together with a pressure-sensitive adhesive layer when the radiation curable pressure-sensitive adhesive sheet of the present invention is used (laminated) on the object. A separator (release liner) to be peeled off at the time of use (lamination) of the pressure-sensitive adhesive sheet is not included in the above substrate.

Hereinafter, embodiments of the present invention will be described with reference to the accompanying figures, but the present invention is not limited thereto. The embodiments are merely illustrative.

FIG. 1 is a cross-sectional view illustrating one embodiment of a radiation curable pressure-sensitive adhesive sheet according to the present invention.

A radiation curable pressure-sensitive adhesive sheet 1 according to one embodiment of the present invention in FIG. 1 is composed of: a pressure-sensitive adhesive layer 10; a release sheet S1 laminated onto one of opposite principal surfaces 10A of the pressure-sensitive adhesive layer 10; and a release sheet S2 laminated onto the other principal surface 10B of the pressure-sensitive adhesive layer 10.

In FIG. 1, the pressure-sensitive adhesive layer 10 comprises a base pressure-sensitive adhesive material and two opposite principal surfaces (first principal surface 10A and second principal surface 10B) and may be a single layer or have a laminated structure of two or more layers.

The thickness of the pressure-sensitive adhesive layer 10 is not particularly limited but is typically 5 μm to 500 μm, preferably 5 μm to 400 μm, even more preferably 5 μm to 350 μm. If the thickness of the pressure-sensitive adhesive layer 10 is in this range, it is preferable in that the pressure-sensitive adhesive layer 10 can follow such that no bubbles are left in the stepped space, can reduce stress strain caused by the stepped space to suppress display unevenness, and has excellent level difference absorbability and stress relaxation properties.

As measured according to JIS K7361, total light transmittance of the entire pressure-sensitive adhesive layer 10 is not particularly limited but is preferably 80% or more and preferably 90% or more. The higher total light transmittance of the pressure-sensitive adhesive layer 10 provides better results. Furthermore, a haze value thereof is preferably 1.5% or less, more preferably 1% or less, and 0.8% or less.

The pressure-sensitive adhesive layer 10 contains a photopolymerization initiator 11a and a crosslinking agent 11b. The photopolymerization initiator 11a and the crosslinking agent 11b are preferably dissolved in the pressure-sensitive adhesive layer 10. Herein, "dissolution" means, for example, that the photopolymerization initiator 11a and the crosslinking agent 11b dissolve to such an extent that the transparency of the pressure-sensitive adhesive layer 10 can be maintained, i.e., white turbidity caused by light scattering does not occur. Specifically, the photopolymerization initiator 11a and the crosslinking agent 11b are preferably contained in the pressure-sensitive adhesive layer 10 so that the haze value thereof is 1.5% or less, preferably 1% or less, and 0.8% or less. The present invention encompasses an embodiment in which either one of the photopolymerization initiator 11a and the crosslinking agent 11b is dissolved in the pressure-sensitive adhesive layer 10.

The photopolymerization initiator 11a contained in the pressure-sensitive adhesive layer 10 has a pKa in the range of 5 to 12.7. When the photopolymerization initiator 11a has a pKa in the range of 5 to 12.7, the pressure-sensitive adhesive layer 10 can suppress the progress of curing during storage, can maintain excellent level difference absorbability and stress relaxation properties for a long time, and has excellent storage stability.

When the pressure-sensitive adhesive layer 10 is stored at 50° C. for 4 weeks, the rate of change in residual stress (N/cm$^2$) (sometimes referred to herein simply as "residual stress change rate") expressed by the following equation is 70% or less.

Residual stress change rate (%)=(residual stress after storage at 50° C. for 4 weeks−initial residual stress)/(initial residual stress)×100

The configuration in which the rate of change in residual stress is 70% or less is preferable in terms of being able to maintain excellent level difference absorbability and stress relaxation properties when the radiation curable pressure-sensitive adhesive sheet 1 is used.

Hereinafter, each configuration will be described in detail.
<Pressure-Sensitive Adhesive Layer>

The pressure-sensitive adhesive layer of the present invention is cured by irradiation with radiation, and the photopolymerization initiator of the present invention and the crosslinking agent of the present invention cause a polymerization reaction or a crosslinking reaction by irradiation with radiation to be cured. The pressure-sensitive adhesive layer is in a state of high fluidity, excellent level difference absorbability, and excellent stress relaxation properties before curing. Therefore, the pressure-sensitive adhesive layer of the present invention can sufficiently follow a stepped space of a transparent electroconductive printed layer, such as a patterned ITO, formed on a surface of an optical element, silver or copper lead wiring, and a black concealing portion formed in a frame shape in a peripheral edge portion of a transparent cover element to be filled without bubbles remaining or gaps and can reduce stress strain caused by the stepped space to suppress display unevenness. The pressure-sensitive adhesive layer of the present invention has the advantage that curing proceeds upon subsequent irradiation with radiation by a reaction between the photopolymerization initiator of the present invention and the crosslinking agent of the present invention contained in pressure-sensitive adhesive layer, thereby improving adhesive reliability.

When the pressure-sensitive adhesive layer is stored at 50° C. for 4 weeks, the rate of change in residual stress ($N/cm^2$) expressed by the following equation is 70% or less.

Residual stress change rate (%)=(residual stress after storage at 50° C. for 4 weeks−initial residual stress)/(initial residual stress)×100

When the radiation curable pressure-sensitive adhesive sheet is stored for a relatively long period of time, there is a problem that curing by a reaction of a photopolymerization initiator or a crosslinking agent contained in the pressure-sensitive adhesive layer gradually proceeds due to an environmental factor such as heat or light, resulting in deterioration of level difference absorbability and stress relaxation properties. The configuration in which the residual stress change rate is 70% or less is suitable in terms of being able to suppress the progress of curing of the pressure-sensitive adhesive layer of the present invention during storage of the radiation curable pressure-sensitive adhesive sheet of the present invention, being able to maintain excellent level difference absorbability and stress relaxation properties for a long time, and having excellent storage stability.

In terms of being able to suppress the progress of curing of the pressure-sensitive adhesive layer of the present invention during storage, being able to maintain excellent level difference absorbability and stress relaxation properties for a long time, and having excellent storage stability, the residual stress change rate is preferably 60% or less and more preferably 55% or less, and may be 50% or less, 45% or less, 40% or less, 35% or less, or 30% or less. It is most preferable that the lower limit of the residual stress change rate does not change, i.e., the residual stress change rate is 0%, but it can be said that the storage stability is excellent if the rate is about 1%.

The pressure-sensitive adhesive layer of the present invention preferably has an initial residual stress of 13 $N/cm^2$ or less at room temperature (e.g., 10 to 25° C., especially 25° C.). The configuration in which the pressure-sensitive adhesive layer of the present invention has an initial residual stress of 13 $N/cm^2$ or less at room temperature is preferable in that the pressure-sensitive adhesive layer of the present invention has excellent level difference absorbability and stress relaxation properties. In terms of excellent level difference absorbability and stress relaxation properties of the pressure-sensitive adhesive layer of the present invention, the initial residual stress at room temperature is more preferably 12 $N/cm^2$ or less, and may be 11 $N/cm^2$ or less, 10 $N/cm^2$ or less, 9 $N/cm^2$ or less, 8 $N/cm^2$ or less, 7 $N/cm^2$ or less, 6 $N/cm^2$ or less, 5 $N/cm^2$ or less, or 4 $N/cm^2$ or less.

The pressure-sensitive adhesive layer of the present invention preferably has an initial residual stress of 13 $N/cm^2$ or less at 40° C. The configuration in which the pressure-sensitive adhesive layer of the present invention has an initial residual stress of 13 $N/cm^2$ or less at 40° C. is preferable in that the pressure-sensitive adhesive layer of the present invention has excellent level difference absorbability and stress relaxation properties. In terms of excellent level difference absorbability and stress relaxation properties of the pressure-sensitive adhesive layer of the present invention, the initial residual stress at 40° C. is more preferably 12 $N/cm^2$ or less, and may be 11 $N/cm^2$ or less, 10 $N/cm^2$ or less, 9 $N/cm^2$ or less, 8 $N/cm^2$ or less, 7 $N/cm^2$ or less, 6 $N/cm^2$ or less, 5 $N/cm^2$ or less, 4 $N/cm^2$ or less, or 3 $N/cm^2$ or less.

The pressure-sensitive adhesive layer of the present invention preferably has an initial residual stress of 15.5 $N/cm^2$ or less at 0° C. The configuration in which the pressure-sensitive adhesive layer of the present invention has an initial residual stress of 15.5 $N/cm^2$ or less at 0° C. is preferable in that the pressure-sensitive adhesive layer of the present invention has excellent level difference absorbability and stress relaxation properties. In terms of excellent level difference absorbability and stress relaxation properties of the pressure-sensitive adhesive layer of the present invention, the initial residual stress at 0° C. is more preferably 15 $N/cm^2$ or less, 14 $N/cm^2$ or less, 13 $N/cm^2$ or less, 12 $N/cm^2$ or less, and may be 11 $N/cm^2$ or less, 10 $N/cm^2$ or less, 9 $N/cm^2$ or less, 8 $N/cm^2$ or less, or 7 $N/cm^2$ or less.

The residual stress change rate and residual stress at room temperature, 40° C., or 0° C. in the pressure-sensitive adhesive layer of the present invention can be adjusted to desired ranges by adjusting the composition of monomer components of a base pressure-sensitive adhesive material contained in a pressure-sensitive adhesive composition for forming the pressure-sensitive adhesive layer described later, the type and blending amount of crosslinking agents (including first and second crosslinking agents described later), the type, blending amount, and pKa of polymerization initiators (including first and second photopolymerization initiators described later), and the type, blending amount, and pKa of other additives such as hindered amine light stabilizers.

The base pressure-sensitive adhesive material contained in the pressure-sensitive adhesive composition for forming the pressure-sensitive adhesive layer of the present invention is not particularly limited as long as it is an adherent material usable in optical applications. For example, it is possible to use one or more appropriately selected from an acrylic pressure-sensitive adhesive, a rubber-based pressure-sensitive adhesive, a silicone-based pressure-sensitive adhesive, a polyester-based pressure-sensitive adhesive, a urethane-based pressure-sensitive adhesive, an epoxy-based pressure-sensitive adhesive, and a polyether-based pressure-sensitive adhesive. From the viewpoint of transparency, processability, durability, etc., it is preferable to use an acrylic pressure-sensitive adhesive. As the base pressure-sensitive adhesive material, the above pressure-sensitive adhesives can be used independently or in combination of two or more thereof. An acrylic polymer to be used as a base polymer of an acrylic pressure-sensitive adhesive is preferably, but not particularly limited to, a homopolymer or a copolymer of monomers containing a primary component consisting of (meth)acrylic acid alkyl ester. The expression "(meth)acrylic" is used herein to mean either one or both of "acrylic" and "methacrylic", and the same applies to the other. In the present invention, the term "acrylic polymer" is used to mean that it may include the above (meth)acrylic acid alkyl ester and another monomer copolymerizable with it.

When the base pressure-sensitive adhesive material contains an acrylic polymer as an acrylic pressure-sensitive adhesive, the acrylic polymer preferably contains a monomer unit derived from an acrylic acid alkyl ester having a linear or branched alkyl group and/or a methacrylic acid alkyl ester having a linear or branched alkyl group as the main monomer unit in the highest proportion by weight.

Examples of the (meth)acrylic acid alkyl ester having a linear or branched alkyl group to constitute the monomer unit of the acrylic polymer, i.e., the (meth)acrylic acid alkyl ester having a linear or branched alkyl group contained in a monomer component to form the acrylic polymer, include a (meth)acrylic acid alkyl ester having a linear or branched alkyl group with 1 to 20 carbon atoms, such as methyl (meth)acrylate, ethyl (meth)acrylate, propyl (meth)acrylate, isopropyl (meth)acrylate, n-butyl (meth)acrylate, s-butyl (meth)acrylate, isobutyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, isostearyl (meth)acrylate, nonadecyl (meth)acrylate, and eicosyl (meth)acrylate. As the (meth)acrylic acid alkyl ester for the acrylic polymer, one (meth)acrylic acid alkyl ester may be used, or two or more (meth)acrylic acid alkyl esters may be used. In the present embodiment, at least one selected from the group consisting of n-butyl acrylate, 2-ethylhexyl acrylate, and isostearyl acrylate is preferably used as the (meth)acrylic acid alkyl ester for the acrylic polymer.

In the acrylic polymer, a proportion of the monomer unit derived from the (meth)acrylic acid alkyl ester having a linear or branched alkyl group is preferably 50% by weight or more, more preferably 60% by weight or more, more preferably 70% by weight or more, more preferably 80% by weight or more, and more preferably 90% by weight or more. In other words, the proportion of the (meth)acrylic acid alkyl ester in a monomer composition of a raw material to form the acrylic polymer is preferably 50% by weight or more, more preferably 60% by weight or more, more preferably 70% by weight or more, more preferably 80% by weight or more, and more preferably 90% by weight or more.

The acrylic polymer contained in the base pressure-sensitive adhesive material may contain a monomer unit derived from an alicyclic monomer. Examples of the alicyclic monomer to constitute the monomer unit of the acrylic polymer, i.e., the alicyclic monomer contained in the monomer component to form the acrylic polymer, include (meth) acrylic acid cycloalkyl ester, (meth)acrylic acid ester having a bicyclic hydrocarbon ring, and (meth)acrylic acid ester having a tricyclic or more hydrocarbon ring. Examples of the (meth)acrylic acid cycloalkyl ester include cyclopentyl (meth)acrylate, cyclohexyl (meth)acrylate, cycloheptyl (meth)acrylate, and cyclooctyl (meth)acrylate. Examples of the (meth)acrylic acid ester having bicyclic hydrocarbon ring include bornyl (meth)acrylate and isobornyl (meth) acrylate. Examples of the (meth)acrylic acid ester having a tricyclic or more hydrocarbon ring include dicyclopentanyl (meth)acrylate, dicyclopentanyloxyethyl (meth)acrylate, tricyclopentanyl (meth)acrylate, 1-adamantyl (meth)acrylate, 2-methyl-2-adamantyl (meth)acrylate, and 2-ethyl-2-adamantyl (meth)acrylate. As the alicyclic monomer for the acrylic polymer, one alicyclic monomer may be used, or two or more alicyclic monomers may be used. In the present embodiment, at least one selected from the group consisting of cyclohexyl acrylate, cyclohexyl methacrylate, isobornyl acrylate, and isobornyl methacrylate is preferably used as the alicyclic monomer for the acrylic polymer.

In the acrylic polymer, a proportion of the monomer unit derived from the alicyclic monomer is preferably 5 to 60% by weight, more preferably 10 to 50% by weight, more preferably 12 to 40% by weight, from the viewpoint of realizing appropriate flexibility in the base pressure-sensitive adhesive material formed containing the acrylic polymer.

The acrylic polymer contained in the base pressure-sensitive adhesive material may contain a monomer unit derived from a hydroxy group-containing monomer. The hydroxy group-containing monomer is a monomer having at least one hydroxy group in its monomer unit. When the acrylic polymer in the base pressure-sensitive adhesive material contains a hydroxy group-containing monomer unit, the base pressure-sensitive adhesive material readily offers adhesiveness and appropriate cohesive force. The hydroxy group may also serve as a reactive site to a crosslinking agent described later.

Examples of the hydroxy group-containing monomer to constitute a monomer unit of the acrylic polymer, i.e., the hydroxy group-containing monomer contained in the monomer component to form the acrylic polymer, include hydroxy group-containing (meth)acrylic acid ester, vinyl alcohol, and allyl alcohol. Examples of the hydroxy group-containing (meth)acrylic acid ester include 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, hydroxyoctyl (meth)acrylate, hydroxydecyl (meth)acrylate, hydroxylauryl (meth)acrylate, and (4-hydroxymethylcyclohexyl)methyl (meth)acrylate. As the hydroxy group-containing monomer for the acrylic polymer, one hydroxy group-containing monomer may be used, or two or more hydroxy group-containing monomers may be used. In the present embodiment, at least one selected from the group consisting of 2-hydroxyethyl acrylate, 2-hydroxyetoyl methacrylate, 2-hydroxypropyl acrylate, 2-hydroxypropyl methacrylate, 4-hydroxybutyl acrylate, and 4-hydroxybutyl methacrylate is preferably used as the hydroxy group-containing monomer for the acrylic polymer.

In the acrylic polymer, a proportion of the monomer unit derived from the hydroxy group-containing monomer is preferably 1% by weight or more, more preferably 2% by weight or more, more preferably 3% by weight or more, more preferably 7% by weight or more, more preferably 10% by weight or more, and more preferably 15% by weight or more. In the acrylic polymer, the proportion of the monomer unit derived from the hydroxy group-containing monomer is preferably 35% by weight or less and more preferably 30% by weight or less. These configurations regarding the proportion of the hydroxy group-containing monomer are preferable to realize adhesiveness and appropriate cohesive force in the base pressure-sensitive adhesive material formed containing the acrylic polymer.

The acrylic polymer contained in the base pressure-sensitive adhesive material may contain a monomer unit derived from a nitrogen atom-containing monomer. The nitrogen atom-containing monomer is a monomer having at least one nitrogen atom in its monomer unit. When the acrylic polymer in the base pressure-sensitive adhesive material contains a nitrogen atom-containing monomer unit, the base pressure-sensitive adhesive material readily offers hardness and satisfactory adhesive reliability.

Examples of the nitrogen atom-containing monomer to constitute a monomer unit of the acrylic polymer, i.e., the nitrogen atom-containing monomer contained in the monomer component to form the acrylic polymer, include cyclic N-vinylamides and (meth)acrylamides. Examples of the cyclic N-vinylamides which are nitrogen atom-containing monomers include N-vinyl-2-pyrrolidone, N-vinyl-2-piperidone, N-vinyl-3-morpholinone, N-vinyl-2-caprolactam, N-vinyl-1,3-oxazin-2-one, and N-vinyl-3,5-morpholinedione. Examples of the (meth)acrylamides which are nitrogen atom-containing monomers include (meth)acrylamide, N-ethyl (meth)acrylamide, N-isopropyl (meth)acrylamide, N-n-butyl (meth)acrylamide, N-octyl (meth)acrylamide, N,N-dimethyl (meth)acrylamide, N,N-diethyl (meth)acrylamide, N,N-dipropyl (meth)acrylamide, and N,N-diisopropyl (meth)acrylamide. As the nitrogen atom-containing monomer for the acrylic polymer, one nitrogen atom-containing monomer may be used, or two or more nitrogen atom-containing monomers may be used. In the present embodiment, N-vinyl-2-pyrrolidone is preferably used as the nitrogen atom-containing monomer for the acrylic polymer.

In the acrylic polymer, a proportion of the monomer unit derived from the nitrogen atom-containing monomer is preferably 1% by weight or more, more preferably 3% by weight or more, and more preferably 5% by weight or more, from the viewpoint of realizing appropriate hardness, adhesiveness, and transparency in the base pressure-sensitive adhesive material formed containing the acrylic polymer. In the acrylic polymer, the proportion of the monomer unit derived from the nitrogen atom-containing monomer is preferably 30% by weight or less and more preferably 25% by weight or less, from the viewpoint of realizing sufficient transparency in the base pressure-sensitive adhesive material formed by containing the acrylic polymer and the viewpoint of suppressing the base pressure-sensitive adhesive material from becoming excessively hard to realize satisfactory adhesive reliability.

The acrylic polymer contained in the base pressure-sensitive adhesive material may contain a monomer unit derived from a carboxy group-containing monomer. The carboxy group-containing monomer is a monomer having at least one carboxy group in its monomer unit. When the acrylic polymer in the base pressure-sensitive adhesive material contains a carboxy group-containing monomer unit, the base pressure-sensitive adhesive material may offer satisfactory adhesive reliability. The carboxy group may also serve as a reactive site to a crosslinking agent described later.

Examples of the carboxy group-containing monomer to constitute a monomer unit of the acrylic polymer, i.e., the carboxy group-containing monomer contained in the monomer component to form the acrylic polymer, include (meth)acrylic acid, itaconic acid, maleic acid, fumaric acid, crotonic acid, and isocrotonic acid. As the carboxy group-containing monomer for the acrylic polymer, one carboxy group-containing monomer may be used, or two or more carboxy group-containing monomers may be used. In the present embodiment, acrylic acid is preferably used as the carboxy group-containing monomer for the acrylic polymer.

In the acrylic polymer, a proportion of the monomer unit derived from the carboxy group-containing monomer is preferably 0.1% by weight or more and more preferably 0.5% by weight or more, from the viewpoint of obtaining a contribution of interaction between a polar group and a carboxy group when the polar group is present on an object surface in the base pressure-sensitive adhesive material formed by containing the acrylic polymer to ensure satisfactory adhesive reliability. In the acrylic polymer, the proportion of the monomer unit derived from the carboxy group-containing monomer is also preferably 20% by weight or less and more preferably 15% by weight or less, from the viewpoint of suppressing the base pressure-sensitive adhesive material formed by containing the acrylic polymer from becoming excessively hard to realize satisfactory adhesive reliability.

The acrylic polymer contained in the base pressure-sensitive adhesive material may have a crosslinked structure derived from a crosslinking agent. Having a crosslinked structure, the base pressure-sensitive adhesive material has an increased viscosity and thus making it easier to improve shape stability. Examples of the crosslinking agent include polyfunctional (meth)acrylate which is a copolymerizable crosslinking agent and a thermosetting crosslinking agent. The acrylic polymer may have a crosslinked structure derived only from the polyfunctional (meth)acrylate, a crosslinked structure derived only from the thermosetting crosslinking agent, and a crosslinked structure derived from both the polyfunctional (meth)acrylate and the thermosetting crosslinking agent.

Note that the crosslinking agent has already formed a crosslinked structure by the progress of a crosslinking reaction in the acrylic polymer forming the pressure-sensitive adhesive layer of the present invention. On the other hand, the crosslinking agent of the present invention contained in the pressure-sensitive adhesive layer of the present invention is an unreacted crosslinking agent before forming a crosslinked structure. Therefore, the crosslinking agent forming a crosslinked structure in the acrylic polymer forming the pressure-sensitive adhesive layer of the present invention does not correspond to the crosslinking agent of the present invention contained in the pressure-sensitive adhesive layer of the present invention. In the present specification, the crosslinking agent forming a crosslinked structure in the acrylic polymer is sometimes referred to as a "first crosslinking agent", and the crosslinking agent of the present invention is sometimes referred to as a "second crosslinking agent".

Examples of the polyfunctional (meth)acrylate as the first crosslinking agent include 1,6-hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl(meth)acrylate, and vinyl(meth)acrylate. As the polyfunctional (meth)acrylate for the acrylic polymer, one polyfunctional (meth)acrylate may be used, or two or more polyfunctional (meth)acrylates may be used. In the present embodiment, at least one selected from the group consisting of 1,6-hexanediol diacrylate, dipentaerythritol hexaacrylate, and trimethylolpropane triacrylate is preferably used as the polyfunctional (meth)acrylate for the acrylic polymer.

In the acrylic polymer, a proportion of the monomer unit derived from the polyfunctional (meth)acrylate as the first crosslinking agent is preferably 0.001% by weight or more and more preferably 0.005% by weight or more, and may be 0.01% by weight or more, 0.015% by weight or more, 0.02% by weight or more, 0.025% by weight or more, 0.03% by weight or more, 0.035% by weight or more, 0.04% by weight or more, 0.045% by weight or more, 0.05% by weight or more, 0.06% by weight or more, 0.07% by weight or more, 0.08% by weight or more, 0.09% by weight or more, or 0.1% by weight or more. In the acrylic polymer, the proportion of the monomer unit derived from the polyfunctional (meth)acrylate as the first crosslinking agent is preferably 1% by weight or less and more preferably 0.9% by weight or less, and may be 0.8% by weight or less, 0.7% by weight or less, 0.6% by weight or less, or 0.5% by weight or less. These configurations regarding the proportion of the polyfunctional (meth)acrylate as the first crosslinking agent are preferable to realize appropriate hardness, adhesiveness, and shape stability in the base pressure-sensitive adhesive material formed by containing the acrylic polymer.

Examples of the thermosetting crosslinking agent as the first crosslinking agent include an isocyanate-based crosslinking agent, an epoxy-based crosslinking agent, a metal chelate-based crosslinking agent, a melamine-based crosslinking agent, a peroxide-based crosslinking agent, an urea-based crosslinking agent, a metal alkoxide-based crosslinking agent, a metal salt-based crosslinking agent, a carbodiimide-based crosslinking agent, an oxazoline-based crosslinking agent, an aziridine-based crosslinking agent, and an amine-based crosslinking agent. The base pressure-sensitive adhesive material may contain one of the thermosetting crosslinking agents or two or more of the thermosetting crosslinking agents. Preferably, at least one selected from the group consisting of an isocyanate-based crosslinking agent and an epoxy-based crosslinking agent is used.

Examples of the isocyanate-based crosslinking agent include lower aliphatic polyisocyanates, alicyclic polyisocyanates, and aromatic polyisocyanates. Examples of the lower aliphatic polyisocyanates include 1,2-ethylene diisocyanate, 1,4-butylene diisocyanate, and 1,6-hexamethylene diisocyanate. Examples of the alicyclic polyisocyanates include cyclopentylene diisocyanate, cyclohexylene diisocyanate, isophorone diisocyanate, hydrogenated tolylene diisocyanate, and hydrogenated xylene diisocyanate. Examples of the aromatic polyisocyanates include 2,4-tolylene diisocyanate, 2,6-tolylene diisocyanate, 4,4'-diphenylmethane diisocyanate, and xylylene diisocyanate. Examples of the isocyanate-based crosslinking agent include commercial products such as trimethylolpropane/tolylene diisocyanate adduct (trade name "CORONATE L", manufactured by Tosoh Corporation), trimethylolpropane/hexamethylene diisocyanate adduct (trade name "CORONATE HL", manufactured by Tosoh Corporation), and trimethylolpropane/xylylene diisocyanate adduct (trade name "TAKENATE D-110N", manufactured by Mitsui Chemicals Inc.).

Examples of the epoxy-based crosslinking agent (polyfunctional epoxy compound) include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2,-hydroxyethyl)isocyanurate, resorcin diglycidyl ether, and bisphenol-S-diglycidyl ether. Examples of the epoxy-based crosslinking agent include an epoxy-based resin having two or more epoxy groups. In addition, examples of the epoxy-based crosslinking agent include commercial products such as trade name "TETRAD C" (manufactured by Mitsubishi Gas Chemical Company, Inc.).

When the base pressure-sensitive adhesive material contains the above thermosetting crosslinking agent as the first crosslinking agent for crosslinking between the acrylic polymers, a content of the thermosetting crosslinking agent in the base pressure-sensitive adhesive material is preferably 0.001 parts by weight or more and more preferably 0.01 parts by weight or more relative to 100 parts by weight of the acrylic polymer in the base pressure-sensitive adhesive material, from the viewpoint of making it easier to improve the shape stability of the base pressure-sensitive adhesive material, and thus realizing sufficient adhesive reliability to the object. The content of the thermosetting crosslinking agent in the base pressure-sensitive adhesive material is also preferably 10 parts by weight or less and more preferably 5 parts by weight or less relative to 100 parts by weight of the acrylic polymer in the base pressure-sensitive adhesive material, from the viewpoint of imparting appropriate flexibility to the base pressure-sensitive adhesive material to realize satisfactory adhesive strength.

When the base pressure-sensitive adhesive material contains the above acrylic polymer as a pressure-sensitive adhesive, a content ratio of the acrylic polymer in the base pressure-sensitive adhesive material is, for example, 85 to 100% by weight.

The base pressure-sensitive adhesive material may also contain a polymerization initiator in addition to the monomer to form the acrylic polymer and the first crosslinking agent. Examples of the polymerization initiator include a photopolymerization initiator and a thermopolymerization initiator. The base pressure-sensitive adhesive material may contain one polymerization initiator or two or more polymerization initiators.

Note that the polymerization initiator functions as a catalyst for promoting the polymerization and crosslinking reaction of the above monomer component and the crosslinking agent to form an acrylic polymer. Therefore, it is considered that the acrylic polymer is deactivated and decomposed when the acrylic polymer is formed and does not remain in the pressure-sensitive adhesive layer of the present invention or remains in a trace amount even if it remains. On the other hand, the photopolymerization initiator of the present invention is contained in the pressure-sensitive adhesive layer of the present invention together with the acrylic polymer and promotes the crosslinking reaction of the crosslinking agent of the present invention. Therefore, the photopolymerization initiator for forming the acrylic polymer does not correspond to the photopolymerization initiator of the present invention, and a photopolymerization initiator whose pKa does not correspond to 5 to 12.7 can also be used without limitation. In the present specification, the photopolymerization initiator for forming the acrylic polymer is sometimes referred to as a "first photopolymerization initiator", and the photopolymerization initiator of the present invention is sometimes referred to as a "second photopolymerization initiator".

Examples of the first photopolymerization initiator include a benzoin ether-based photopolymerization initiator, an acetophenone-based photopolymerization initiator, an aminoacetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzyl-based photopolymerization initiator, a benzophenone-based photopolymerization initiator, a ketal-based photopolymerization initiator, and a thioxanthone-based photopolymerization initiator. Examples of the benzoin ether-based photopolymerization initiator include benzoin methyl ether, benzoin ethyl ether, benzoin propyl ether, benzoin isopropyl ether, benzoin isobutyl ether, and 2,2-dimethoxy-1,2-diphenylethan-1-one. Examples of the acetophenone-based photopolymerization initiator include 2,2-diethoxyacetophenone, 2,2-dimethoxy-2-phenylacetophenone, 1-hydroxycyclohexyl phenyl ketone, 4-phenoxy dichloroacetophenone, and 4-(t-butyl)dichloroacetophenone. Examples of the aminoacetophenone-based photopolymerization initiator include 2-methyl-1-[4-(methylthio)phenyl]-2-morpholinopropan-1-one, 2-methyl-1-phenyl-2-morpholinopropan-1-one, 2-methyl-1-[4-(hexyl)phenyl]-2-morpholinopropan-1-one, 2-ethyl-2-dimethylamino-1-(4-morpholinophenyl)-butanone-1, 2-benzyl-2-dimethylamino-1-(4-morpholinophenyl)-butanone-1, and 2-(dimethylamino)-2-[(4-methylphenyl)methyl]-1-[4-(4-morpholinyl)phenyl]-1-butanone. Examples of the α-ketol-based photopolymerization initiator include 2-methyl-2-hydroxy propiophenone, 1-hydroxycyclohexyl phenyl ketone, 2-hydroxy-1-(4-(4-(2-hydroxy-2-methylpropionyl)benzyl)phenyl)-2-methylpropan-1-one and 1-[4-(2-hydroxyethyl)phenyl]-2-methylpropan-1-one. Examples of the aromatic sulfonyl chloride-based photopolymerization initiator include 2-naphthalenesulfonyl chloride. Examples of the photoactive oxime-based photopolymerization initiator include 1-phenyl-1,1-propanedione-2-(o-ethoxycarbonyl)-oxime. Examples of the benzoin-based photopolymerization initiator include benzoin. Examples of the benzyl-based photopolymerization initiator include benzyl. Examples of the benzophenone-based photopolymerization initiator include benzophenone, benzoylbenzoic acid, 3,3'-dimethyl-4-methoxy benzophenone, and polyvinyl benzophenone. Examples of the ketal-based photopolymerization initiator include benzyl dimethyl ketal. Examples of the thioxanthone-based photopolymerization initiator include thioxanthone, 2-chloro thioxanthone, 2-methyl thioxanthone, 2,4-dimethyl thioxanthone, isopropyl thioxanthone, 2,4-diisopropyl thioxanthone, and dodecyl thioxanthone.

An amount of the first photopolymerization initiator to be used is not particularly limited, but for example, it is preferably 0.001 to 1 part by weight and more preferably 0.01 to 0.50 parts by weight relative to 100 parts by weight of a total monomer unit of the acrylic polymer (total monomer component constituting the acrylic polymer).

Examples of the thermopolymerization initiator include an azo-based polymerization initiator, a peroxide-based polymerization initiator, and a redox-based polymerization initiator. Examples of the azo-based polymerization initiator include 2,2'-azobisisobutyronitrile (AIBN), 2,2'-azobis-2-methylbutyronitrile (AMBN), 2,2'-azobis(2-methylpropionate)dimethyl, 4,4'-azobis-4-cyanovaleric acid, 2,2'-azobis(4-methoxy-2,4-dimethylvaleronitrile), 2,2'-azobis(2,4-dimethylvaleronitrile), 1,1'-azobis(cyclohexane-1-carbonitrile), and 2,2'-azobis(2,4,4-trimethylpentane). Examples of the peroxide-based polymerization initiator include benzoyl peroxide, t-butyl hydroperoxide, di-t-butyl peroxide, t-butyl peroxybenzoate, dicumyl peroxide, 1,1-bis(t-butyl peroxy)-3,3,5-trimethylcyclohexane, and 1,1-bis(t-butyl peroxy)cyclododecane.

An amount of the thermopolymerization initiator to be used is not particularly limited, but for example, it is preferably 0.05 to 0.5 parts by weight and more preferably 0.1 to 0.3 parts by weight relative to 100 parts by weight of a total monomer unit of the acrylic polymer (total content of a monomer component constituting the acrylic polymer).

The pressure-sensitive adhesive composition may further contain additives, in addition to the base pressure-sensitive adhesive material, such as an ultraviolet absorbing agent, a rust inhibitor, an antistatic agent, a crosslinking accelerator, a silane coupling agent, a tackifier resin, an anti-aging agent, a filler, a coloring agent including pigment and dye, an antioxidant, a chain transfer agent, a plasticizer, a softener, and a surfactant, if necessary. Examples of the tackifier resin include a rosin derivative, polyterpene resin, petroleum resin, and oil-soluble phenol.

As the crosslinking agent of the present invention (second crosslinking agent) contained in the pressure-sensitive adhesive layer of the present invention, those illustrated as the above first crosslinking agent can be used without limitation, and a polyfunctional(meth)acrylate, which is a crosslinking agent having polymerization properties by irradiation with radiation (radiation curability) is preferable. As the second crosslinking agent, one of the crosslinking agent may be used, or two or more of the crosslinking agents may be used. In addition, the first crosslinking agent and the second crosslinking agent may be the same crosslinking agent or a combination of different crosslinking agents. In the present embodiment, trimethylolpropane tri(meth)acrylate, dipentaerythritol hexa(meth)acrylate, or 1,6-hexanediol di(meth)acrylate is preferably used as the crosslinking agent of the present invention (second crosslinking agent).

The content of the crosslinking agent of the present invention (second crosslinking agent) contained in the pressure-sensitive adhesive layer of the present invention can be appropriately set as long as it can be cured by irradiation with radiation to provide excellent adhesive reliability, and is not particularly limited, but can be selected from the range of, for example, in terms of the upper limit, 20% by weight or less (e.g., 0.001 to 20% by weight, 0.001 to 18% by weight, 0.001 to 16% by weight, 0.001 to 14% by weight, 0.001 to 12% by weight, 0.001 to 10% by weight, 0.001 to 8% by weight, and 0.001 to 6% by weight); or in terms of the lower limit, 0.001% or more (e.g., 0.001 to 20% by weight, 0.005 to 20% by weight, 0.01 to 20% by weight, 0.05 to 20% by weight, 0.1 to 20% by weight, 0.5 to 20% by weight, 1 to 20% by weight, 1.1 to 20% by weight, 1.2 to 20% by weight, and 1.3 to 20% by weight) relative to the pressure-sensitive adhesive layer of the present invention (100% by weight).

The photopolymerization initiator of the present invention (second photopolymerization initiator) contained in the pressure-sensitive adhesive layer of the present invention is not particularly limited, but for example, a photopolymerization initiator having pKa of 5 to 12.7 can be used. By using the photopolymerization initiator having a pKa of 5 to 12.7, it is possible to suppress the progress of curing of the pressure-sensitive adhesive layer of the present invention during storage of the radiation curable pressure-sensitive adhesive sheet of the present invention, maintain excellent level difference absorbability and stress relaxation properties for a long time, and improve excellent storage stability. Of course, the effects of the present application can be exhibited even if the pKa is outside the above range.

The pKa (acid dissociation constant) of the photopolymerization initiator is an index for quantitatively indicating the strength of an acid, and the smaller the pKa, the stronger the acidity. It is considered that when the pressure-sensitive adhesive has a high acid value, the second crosslinking agent (especially, polyfunctional (meth)acrylate) undergoes a Michael addition reaction, resulting in a gradual crosslinking reaction. When the pKa of the photopolymerization initiator of the present invention (second photopolymerization initiator) is in the range of 5 to 12.7, it is presumed that the acid value in the pressure-sensitive adhesive layer is adjusted to suppress the crosslinking reaction over time. Note that this mechanism is presumptive and should not be construed as limiting the scope of the present invention.

In the radiation curable pressure-sensitive adhesive sheet of the present invention, the pKa of the photopolymerization initiator of the present invention is preferably 5.1 or more and more preferably 5.2 or more, and may be 5.3 or more or 5.4 or more in terms of being able to suppress the progress of curing of the pressure-sensitive adhesive layer during storage, being able to maintain excellent level difference absorbability and stress relaxation properties for a long time, and having excellent storage stability. In terms of being able to suppress the progress of curing of the pressure-sensitive adhesive layer during storage, being able to maintain excellent level difference absorbability and stress relaxation properties for a long time, and having excellent storage stability, the pKa of the photopolymerization initiator of the present invention is also preferably 12.5 or less and more preferably 12 or less, and may be 11.5 or less, 11 or less, 10.5 or less, 10 or less, 9.5 or less, 9 or less, 8.5 or less, or 8.0 or less.

The pKa of the photopolymerization initiator can be measured by a known method such as neutralization titration, absorptiometry, or capillary electrophoresis, but may not be applicable in some cases depending on the physical properties of the photopolymerization initiator. Measurement errors may also occur due to measurement conditions such as temperature and concentration. In order to solve such a problem, it is preferable to use a calculated pKa determined from the chemical structural formula of the photopolymerization initiator. The calculated pKa can be easily and accurately determined regardless of the physical properties as long as the chemical structural formula is given, and measurement errors due to measurement conditions and the like do not occur, making it easy to compare photopolymerization initiators. Therefore, it is preferable to use the calculated pKa determined based on the chemical structural formula as the pKa of the photopolymerization initiator of the present invention.

The calculated pKa is not particularly limited, and for example, a chemical structural formula is drawn using ChemDraw 19.0, and the chemical structural formula can be obtained using a computational module. As the computational module, for examples, the Chemoinformatics platform MOSES from Molecular Networks can be used. MOSES is a computational module developed, maintained, and owned by Molecular Networks GmbH (Erlangen, Germany).

As the photopolymerization initiator of the present invention (second photopolymerization initiator) contained in the pressure-sensitive adhesive layer of the present invention, among the photopolymerization initiator illustrated as the above first photopolymerization initiator, a photopolymerization initiator having a pKa of 5 to 12.7 can be used without limitation. Specifically, a chemical structural formula of the photopolymerization initiator is drawn using ChemDraw 19.0, and the chemical structural formula with a calculated pKa of 5 to 12.7 obtained using a computational module can be used. When the first photopolymerization initiator has a pKa of 5 to 12.7, the first photopolymerization initiator and the second photopolymerization initiator may be the same or a combination of different photopolymerization initiators.

Specifically, the photopolymerization initiator of the present invention (second photopolymerization initiator) is preferably a photopolymerization initiator having an amino group and an aromatic ring in the molecule thereof and more preferably a photopolymerization initiator having two or more amino groups and an aromatic ring in the molecule thereof. The photopolymerization initiator of the present invention is preferably an aminoacetophenone-based photopolymerization initiator. The photopolymerization initiator having the chemical structure of the above configuration is considered to have a pKa that is easily controlled in the range of 5 to 12.7 due to the amino group and the aromatic ring in the chemical structure. Note that a photopolymerization initiator having a chemical structure with the above composition but not having a pKa in the range of 5 to 12.7 does not correspond to the photopolymerization initiator of the present invention.

More specifically, the photopolymerization initiator of the present invention (second photopolymerization initiator) is preferably a photopolymerization initiator having a chemical structure of the following formula (1).

[Formula 1]

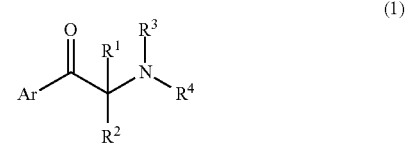

(1)

In the above formula (1), Ar represents a phenyl group substituted with —SR$^5$ or —N(R$^6$)(R$^7$), and R$^5$ represents a hydrogen atom or an alkyl group.

R$^1$ and R$^2$ each independently represent an alkyl group having 1 to 8 carbon atoms. R$^1$ and R$^2$ may bond with each other to form an alkylene group having 2 to 9 carbon atoms.

The alkyl group represented by R$^1$ and R$^2$ may be linear, branched, or cyclic and is preferably linear or branched.

The alkyl group represented by R$^1$ and R$^2$ may be unsubstituted or may have a substituent. Examples of the substituent include an aryl group, a heterocyclic group, a nitro group, a cyano group, a halogen atom, —OR$^a$, —SR$^a$, —COR$^a$, —COOR$^a$, —OCOR$^a$, —NR$^a$R$^b$, —NHCOR$^a$, —CONR$^a$R$^b$, —NHCONR$^a$R$^b$, —NHCOOR$^a$, —SO$_2$R$^a$, —SO$_2$OR$^a$, and —NHSO$_2$R$^a$. R$^a$ and R$^b$ each independently represent a hydrogen atom, an alkyl group, an aryl group, or a heterocyclic group. The substituent is preferably an aryl group. In particular, one of R$^1$ and R$^2$ is preferably an unsubstituted alkyl group while the other is preferably an alkyl group substituted with an aryl group.

Examples of the halogen atom include a fluorine atom, a chlorine atom, a bromine atom, and an iodine atom.

The alkyl group represented by R$^a$ and R$^b$ preferably has 1 to 20 carbon atoms. The alkyl group may be linear, branched, or cyclic and is preferably linear or branched.

The number of carbon atoms in the aryl group as a substituent and the aryl group represented by R$^a$ and R$^b$ is preferably 6 to 20, more preferably 6 to 15, and even more preferably 6 to 10. The aryl group may be either a monocyclic ring or a condensed ring. In the aryl group, a part or all of the hydrogen atom is optionally substituted with an alkyl group having 1 to 8 carbon atoms.

The heterocyclic group represented by $R^a$ and $R^b$ is preferably a 5-membered ring or a 6-membered ring. The heterocyclic group may be either a monocyclic ring or a condensed ring. The number of carbon atoms forming the heterocyclic group is preferably 3 to 30, more preferably 3 to 18, and more preferably 3 to 12. The number of hetero atoms forming the heterocyclic group is preferably 1 to 3. The hetero atom forming the heterocyclic group is preferably an nitrogen atom, oxygen atom, or sulfur atom.

$R^3$ and $R^4$ each independently represent an hydrogen atom, an alkyl group having 1 to 12 carbon atoms, and an alkyl group having 2 to 4 carbon atoms substituted with an alkoxy group having 1 to 4 carbon atoms, or an alkenyl group having 3 to 5 carbon atoms. $R^3$ and $R^4$ may bond with each other to form an alkylene group having 3 to 7 carbon atoms, and the alkylene group may contain —O— or —N($R^8$)— in an alkylene chain thereof. $R^8$ represents an alkyl group having 1 to 4 carbon atoms.

$R^6$ and $R^7$ each independently represent an hydrogen atom, an alkyl group having 1 to 12 carbon atoms, and an alkyl group having 2 to 4 carbon atoms substituted with an alkoxy group having 1 to 4 carbon atoms, or an alkenyl group having 3 to 5 carbon atoms. $R^6$ and $R^7$ may bond with each other to form an alkylene group having 3 to 7 carbon atoms, and the alkylene group may contain —O— or —N($R^9$)— in an alkylene chain thereof. Herein, $R^9$ represents an alkyl group having 1 to 4 carbon atoms.

Examples of the photopolymerization initiator of the present invention (second photopolymerization initiator) include 2-methyl-1-[4-(methylthio)phenyl]-2-morpholinopropan-1-one (calculated pKa: 5.56), 2-benzyl-2-dimethylamino-1-(4-morpholinophenyl)-butanone-1 (calculated pKa: 7.68), 2-methyl-1-phenyl-2-morpholinopropan-1-one (calculated pKa: 5.56), 2-methyl-1-[4-(hexyl)phenyl]-2-morpholinopropan-1-one (calculated pKa: 5.56), 2-ethyl-2-dimethylamino-1-(4-morpholinophenyl)-butanone-1 (calculated pKa: 7.96), and 2-(dimethylamino)-2-[(4-methylphenyl)methyl]-1-[4-(4-morpholinyl)phenyl]-1-butanone (calculated pKa: 7.70).

Examples of the photopolymerization initiator of the present invention (second photopolymerization initiator) commercially available include Omnirad 907, Omnirad 369E, and Omnirad 379 (trade name, all of which are manufactured by IGM Resins B.V.).

The content of the photopolymerization initiator of the present invention (second photopolymerization initiator) contained in the pressure-sensitive adhesive layer of the present invention can be appropriately set as long as it can be cured by irradiation with radiation to provide excellent adhesive reliability, and is not particularly limited, but can be selected from the range of, for example, in terms of the upper limit, 2% by weight or less (e.g., 0.0001 to 2% by weight, 0.0001 to 1.8% by weight, 0.0001 to 1.6% by weight, 0.0001 to 1.4% by weight, 0.0001 to 1.2% by weight, 0.0001 to 1.0% by weight, 0.0001 to 0.8% by weight, 0.0001 to 0.6% by weight, 0.0001 to 0.4% by weight, and 0.0001 to 0.2% by weight); or in terms of the lower limit, 0.0001% by weight or more (e.g., 0.0001 to 2% by weight, 0.0002 to 2% by weight, 0.0003 to 2% by weight, 0.0004 to 2% by weight, 0.0005 to 2% by weight, 0.0006 to 2% by weight, 0.0007 to 2% by weight, 0.0008 to 2% by weight, 0.0009 to 2% by weight, 0.001 to 2% by weight, 0.0012 to 2% by weight, 0.0014 to 2% by weight, 0.0016 to 2% by weight, 0.0018 to 2% by weight, and 0.002 to 2% by weight) relative to the pressure-sensitive adhesive layer of the present invention (100% by weight).

The pressure-sensitive adhesive layer of the present invention preferably further contains a hindered amine light stabilizer (HALS) in addition to the photopolymerization initiator of the present invention (second photopolymerization initiator) and the crosslinking agent of the present invention (second crosslinking agent). The configuration in which the pressure-sensitive adhesive layer of the present invention further contains the hindered amine light stabilizer is preferable in that the storage stability of the pressure-sensitive adhesive layer is improved, and excellent level difference absorbability and stress relaxation properties can be maintained for a long period of time. The hindered amine light stabilizer includes those of low and high molecular weights or N-alkyl and N—H types. The hindered amine light stabilizer may be used alone or in a mixture of two or more.

Examples of the hindered amine light stabilizer of low molecular weight include a hindered amine light stabilizer composed of 70% by weight of a reaction product (molecular weight: 737) of decanedioic acid bis[2,2,6,6-tetramethyl-1(octyloxy)-4-piperidinyl] ester, 1,1-dimethylethyl hyproperoxide, and octane and 30% by weight of polypropylene; bis(1,2,2,6,6-pentamethyl-4-piperidyl) [[3, 5-bis(1,1-dimethylethyl)-4-hydroxyphenyl]methyl]butylmalonate (molecular weight: 685); a mixture of bis(1,2,2,6,6-pentamethyl-4-piperidyl) sebacate and methyl-1,2,2,6,6-pentamethyl-4-piperidyl sebacate (molecular weight: 509); bis (2,2,6,6-tetramethyl-4-piperidyl) sebacate (molecular weight: 481); tetrakis (2,2,6,6-tetramethyl-4-piperidyl)-1,2,3,4-butanetetracarboxylate (molecular weight: 791); tetrakis (1,2,2,6,6-pentamethyl-4-piperidyl)-1,2,3,4-butanetetracarboxylate (molecular weight: 847); a mixture of 2,2,6,6-tetramethyl-4-piperidyl-1,2,3,4-butanetetracarboxylate and tridecyl 1,2,3,4-butanetetracarboxylate (molecular weight: 900); and a mixture of 1,2,2,6,6-pentamethyl-4-piperidyl-1,2,3,4-butanetetracarboxylate and tridecyl 1,2,3,4-butanetetracarboxylate (molecular weight: 900).

Examples of the hindered amine light stabilizer of high molecular weight include poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}] (molecular weight: 2000 to 3100); a polymer of dimethyl succinate and 4-hydroxy-2,2,6,6-tetramethyl-1-piperidineethanol (molecular weight: 3100 to 4000); a mixture of N,N',N",N"'-tetrakis-(4,6-bis-(butyl-(N-methyl-2,2,6,6-tetramethylpiperidin-4-yl)amino)-triazin-2-yl)-4,7-diazadecane-1,10-diamine (molecular weight: 2286) and a polymer of dimethyl succinate and 4-hydroxy-2,2,6,6-tetramethyl-1-piperidineethanol; and a polycondensate of dibutylamine, 1,3,5-triazine, N,N'-bis(2,2,6,6-tetramethyl-4-piperidyl-1,6-hexamethylenediamine, and N-(2,2,6,6-tetramethyl-4-piperidyl)butylamine (molecular weight: 2600 to 3400).

When, the pressure-sensitive adhesive layer of the present invention contains the hindered amine light stabilizer, the hindered amine light stabilizer to be used preferably has a pKa of 5 to 12.7. The configuration in which the hindered amine light stabilizer has a pKa of 5 to 12.7 is suitable in terms of being able to suppress the progress of curing of the pressure-sensitive adhesive layer of the present invention during storage of the radiation curable pressure-sensitive adhesive sheet of the present invention, being able to maintain excellent level difference absorbability and stress relaxation properties for a long time, and having excellent storage stability.

The pKa (acid dissociation constant) of the hindered amine light stabilizer is an index for quantitatively indicating the strength of an acid, and the smaller the pKa, the stronger the acidity. It is considered that when the pressure-sensitive adhesive has a high acid value, the second crosslinking agent (especially, polyfunctional (meth)acrylate) undergoes a Michael addition reaction, resulting in a gradual crosslinking reaction. When the pKa of the hindered amine light stabilizer of the present invention is in the range of 5 to 12.7, it is presumed that the acid value in the pressure-sensitive adhesive layer is adjusted to suppress the crosslinking reaction over time. Note that this mechanism is presumptive and should not be construed as limiting the scope of the present invention.

In the radiation curable pressure-sensitive adhesive sheet of the present invention, the pKa of the hindered amine light stabilizer is preferably 5.1 or more and more preferably 5.2 or more, and may be 5.3 or more or 5.4 or more, in terms of being able to suppress the progress of curing of the pressure-sensitive adhesive layer during storage, being able to maintain excellent level difference absorbability and stress relaxation properties for a long time, and having excellent storage stability. In terms of being able to suppress the progress of curing of the pressure-sensitive adhesive layer during storage, being able to maintain excellent level difference absorbability and stress relaxation properties for a long time, and having excellent storage stability, the pKa of the hindered amine light stabilizer is also preferably 12.5 or less and more preferably 12 or less, and may be 11.5 or less, 11 or less, 10.5 or less, 10 or less, or 9.5 or less.

As the pKa of the hindered amine light stabilizer, it is preferable to use a calculated pKa as in the case of the photopolymerization initiator of the present invention. Specifically, a chemical structural formula of the hindered amine light stabilizer is drawn using ChemDraw 19.0, and the chemical structural formula with a calculated pKa of 5 to 12.7 obtained using a computational module is preferably used.

When the pressure-sensitive adhesive layer of the present invention contains a hindered amine light stabilizer, the content thereof can be appropriately set as long as it can be cured by irradiation with radiation to provide excellent adhesive reliability, and is not particularly limited, but can be selected from the range of, for example, in terms of the upper limit, 8% by weight or less (e.g., 0.001 to 8% by weight, 0.001 to 7.5% by weight, 0.001 to 7.0% by weight, 0.001 to 6.5% by weight, 0.001 to 6.0% by weight, 0.001 to 5.5% by weight, 0.001 to 5.0% by weight, 0.001 to 4.5% by weight, and 0.001 to 4.0% by weight); or in terms of the lower limit, 0.001% or more (e.g., 0.001 to 8% by weight, 0.002 to 8% by weight, 0.003 to 8% by weight, 0.004 to 8% by weight, 0.005 to 8% by weight, 0.006 to 8% by weight, 0.007 to 8% by weight, 0.008 to 8% by weight, 0.009 to 8% by weight, and 0.01 to 8% by weight) relative to the pressure-sensitive adhesive layer of the present invention (100% by weight), in terms of being able to suppress the progress of curing of the pressure-sensitive adhesive layer during storage, being able to maintain excellent level difference absorbability and stress relaxation properties for a long time, and having excellent storage stability.

The method of forming the pressure-sensitive adhesive layer of the present invention is not particularly limited, and examples of one embodiment (sometimes referred to herein as "first embodiment") include applying (coating) a pressure-sensitive adhesive composition containing the base pressure-sensitive adhesive material, the photopolymerization initiator of the present invention (second photopolymerization initiator), and the crosslinking agent of the present invention (second crosslinking agent), if necessary, a hindered amine light stabilizer (HALS), and other additives on a support to dry and cure the resulting pressure-sensitive adhesive composition layer; and applying (coating) the pressure-sensitive adhesive composition on a support to cure the resulting pressure-sensitive adhesive composition layer by irradiation with an active energy ray. If necessary, the methods may further include heating and drying.

In order to prevent the crosslinking reaction of the photopolymerization initiator of the present invention and the crosslinking agent of the present invention from proceeding by irradiation with an active energy ray, the pressure-sensitive adhesive composition layer is preferably dried and cured.

The support is not particularly limited and is preferably a plastic film. Examples of materials of the plastic film and the like include plastic materials such as polyester resins including polyethylene terephthalate (PET); acrylic resins including polymethyl methacrylate (PMMA); polycarbonate; triacetyl cellulose (TAC); polysulfone; polyacrylate; polyimide; polyvinyl chloride; polyvinyl acetate; polyethylene; polypropylene; ethylene-propylene copolymer; cyclic olefin-based polymer including trade name "ARTON" (cyclic olefin-based polymer, manufactured by JSR Corporation) and trade name "ZEONOR" (cyclic olefin-based polymer, Zeon Corporation). Note that these plastic materials may be used either alone or in combination of two or more thereof.

The support may be a release sheet. Examples of the release sheet include, but not particularly limited to, a plastic film whose surface is treated by a release agent such as silicon type, long-chain alkyl type, fluorine type, and molybdenum sulfide.

For the application (coating) in the pressure-sensitive adhesive composition, it is possible to use known coating processes, and examples thereof include a coater, such as a gravure roll coater a reverse roll coater, a kiss roll coater, a dip roll coater, a bar coater, a knife coater, a spray coater, a comma coater, or a direct coater.

The drying and curing temperature is preferably 40 to 200° C., more preferably 50 to 180° C., and even more preferably 60 to 170° C. The drying and curing time may be adopted as appropriate and is, for example, 5 seconds to 20 minutes, preferably 5 seconds to 10 minutes, and more preferably 10 seconds to 5 minutes.

Examples of the active energy ray include ionizing radiations such as an α-ray, a β-ray, a γ-ray, a neutron ray, and an electron ray and ultraviolet rays, and particularly, the ultraviolet rays are preferable. Irradiation energy, irradiation time, and irradiation method of the active energy ray are not particularly limited, and each may be set appropriately to achieve a desired viscosity and viscoelasticity, depending on a thickness of a pressure-sensitive adhesive layer or the like.

A principal surface of the pressure-sensitive adhesive layer formed above that does not face the support is preferably further laminated with another support (including a release sheet) to block oxygen that inhibits light curing when the pressure-sensitive adhesive layer is light-cured by the above active energy ray and/or ultraviolet irradiation described later, etc.

Another embodiment of the method of forming the pressure-sensitive adhesive layer according to the present invention (sometimes referred to herein as "second embodiment") preferably involves, for example, forming it by a method including the following processes:
 (a) forming a pressure-sensitive adhesive layer formed of a base pressure-sensitive adhesive material on a support (pressure-sensitive adhesive layer forming step);

(b) curing the pressure-sensitive adhesive layer (pressure-sensitive adhesive layer curing step);
(c) providing a solution of the photopolymerization initiator of the present invention and the crosslinking agent of the present invention to apply the solution to one of opposite surfaces of the cured pressure-sensitive adhesive layer (solution application step);
(d) causing the photopolymerization initiator of the present invention and the crosslinking agent of the present invention contained in the solution to infiltrate from the one surface in a thickness direction of the pressure-sensitive adhesive layer (solution infiltration step); and
(e) drying the pressure-sensitive adhesive layer (drying step).

In the method of the first embodiment, when the pressure-sensitive adhesive composition contains the first photopolymerization initiator for forming the crosslinked structure of the base pressure-sensitive adhesive material and the photopolymerization initiator of the present invention (second photopolymerization initiator), the light absorption wavelength bands of the two photopolymerization initiators need to be sufficiently separated from each other and to distinguish the wavelength regions so that only the curing reaction by the first photopolymerization initiator proceeds while the curing reaction by the second photopolymerization initiator does not proceed, resulting in extremely limited design possibilities. Even when a thermal polymerization initiator is used as the polymerization initiator for forming the crosslinked structure of the base pressure-sensitive adhesive material, curing may proceed by the reaction of the second photopolymerization initiator during thermal curing. Thus, strict control of the curing reaction is required. There is also the problem that thick pressure-sensitive adhesive layers take longer to thermally cure, resulting in lower production efficiency.

On the other hand, since the curing reaction by the first photopolymerization initiator is completed before the addition of the second photopolymerization initiator in the method of the second embodiment, it is not necessary to combine the first photopolymerization initiator or set strict curing conditions that would prevent the curing reaction by the second photopolymerization initiator from progressing, and thus the degree of freedom in designing a pressure-sensitive adhesive is dramatically improved. In other words, since curing reactions of the first and second photopolymerization initiators are separated, the degree of freedom in selecting the combination of the first and second photopolymerization initiator is extremely wide, and thus light absorption wavelength bands of the two photopolymerization initiators can overlap or approximate each other. Furthermore, it is also possible to use a combination of the same polymerization initiator as the first and second polymerization initiators, which had been impossible in the past.

Thus, the extremely high degree of freedom in the combination of the first and second photopolymerization initiators and the possibility of combining identical photopolymerization initiators are also suitable for avoiding the use of polymerization initiators that may cause coloration and degradation of the pressure-sensitive adhesive layer. Moreover, since the curing reactions of the first and second photopolymerization initiators are separated and do not interfere with each other, there is no need to set strict conditions to control the respective curing reactions. For example, it is not necessary to set conditions for the first photopolymerization initiator that prevent the second photopolymerization initiator from progressing. Once the curing conditions capable of imparting excellent level difference absorbability and stress relaxation properties to the pressure-sensitive adhesive layer are determined, the adhesive reliability to be imparted to the pressure-sensitive adhesive layer can be easily controlled by changing the coating and curing conditions for the solution of the second photopolymerization initiator afterward. In addition, even in the case of the combination of the thermal polymerization initiator and the second photopolymerization initiator, since the two curing reactions are separated from each other, there is no need to control to suppress the curing by the second photopolymerization initiator during thermal curing.

FIGS. 2 (a) to (e) are views schematically illustrating a process for implementing one embodiment of the production method according to the second embodiment of the present invention.

Figure 2A:
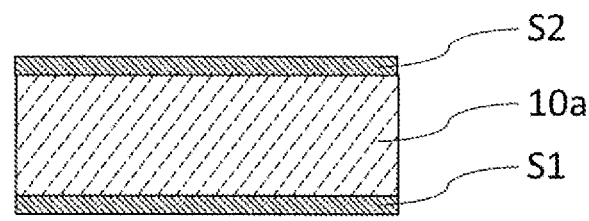
FIG. 2(a) is a schematic view illustrating a pressure-sensitive adhesive layer forming step.

As illustrated in FIG. 2(a), a pressure-sensitive adhesive layer 10a formed of a transparent base pressure-sensitive adhesive material is first formed on a support S1 (pressure-sensitive adhesive layer forming step). As the support, one illustrated as the support of the first embodiment can be used.

In the second embodiment, the method of forming the pressure-sensitive adhesive layer is not particularly limited, and the same method as in the above first embodiment can be used.

Figure 2B:
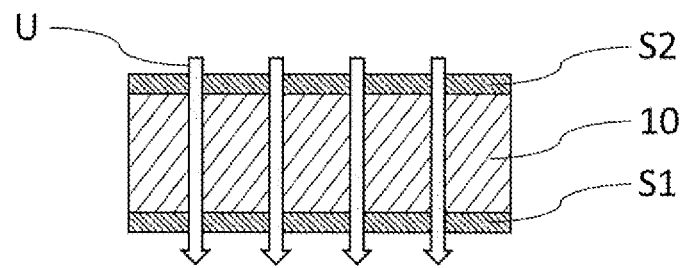
FIG. 2(b) is a schematic view illustrating a pressure-sensitive adhesive layer curing step.

Next, the pressure-sensitive adhesive layer 10a is cured (curing step of pressure-sensitive adhesive layer). In FIG. 2(b), 10 is a pressure-sensitive adhesive layer being the cured pressure-sensitive adhesive layer 10a. Examples of methods of curing the pressure-sensitive adhesive layer 10a include, but not particularly limited to, heating the pressure-sensitive adhesive layer 10a and curing the pressure-sensitive adhesive layer 10a by irradiation with the active energy ray. If necessary, the methods may further include heating and drying. Examples of the active energy ray include ionizing radiations such as an x-ray, a β-ray, a y-ray, a neutron ray, and an electron ray and ultraviolet rays, and particularly, the ultraviolet rays are preferable.

Conditions of curing the pressure-sensitive adhesive layer 10a can be appropriately selected so that the pressure-sensitive adhesive layer 10 has desired physical properties by an embodiment. For example, in the radiation curable pressure-sensitive adhesive sheet of the present invention, heating temperature and time or an irradiation dose of the active energy rays may be set appropriately so that the pressure-sensitive adhesive layer 10 exhibits high fluidity and excellent level difference absorbability and stress relaxation property.

FIG. 2(b) is an embodiment in which the pressure-sensitive adhesive layer 10a is cured by irradiating the pressure-sensitive adhesive layer 10a with an ultraviolet ray U. The pressure-sensitive adhesive layer 10a may be directly irradiated with ultraviolet rays but is preferably irradiated through a support to block oxygen that inhibits curing by ultraviolet irradiation. FIG. 2(b) is an embodiment in which the pressure-sensitive adhesive layer 10a is irradiated with ultraviolet rays through a support S2. When ultraviolet rays are irradiated through a support, another support S2 (including a release sheet) is laminated onto a principal surface of the pressure-sensitive adhesive layer 10a opposite to the principal surface facing the support S1 to irradiate the ultraviolet rays through the support. The illuminance and time of ultraviolet irradiation are appropriately set according to the composition of the base pressure-sensitive adhesive material and the thickness of the pressure-sensitive adhesive layer. For the ultraviolet irradiation, a high-pressure mercury lamp, a low-pressure mercury lamp, a metal halide lamp, and the like can be used.

Figure 2C:
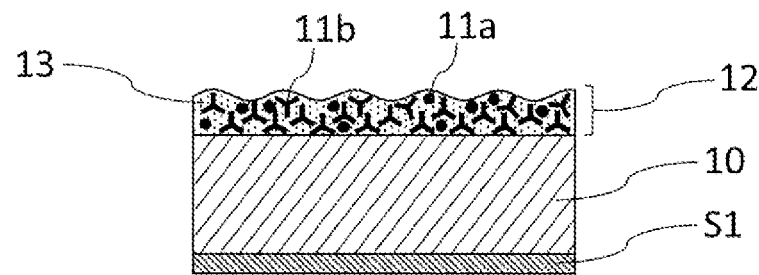
FIG. 2(c) is a schematic view illustrating a solution application step.

Next, as illustrated in FIG. 2(c), after the support S2 is released and removed, a solution 12 of a photopolymerization initiator 11a (second photopolymerization initiator) and a crosslinking agent 11b (second crosslinking agent) is applied to one of opposite surfaces of the pressure-sensitive adhesive layer 10 (solution application step). The solution 12 of the photopolymerization initiator 11a and the crosslinking agent 11b is not particularly limited as long as it can be coated on the pressure-sensitive adhesive layer in liquid form and infiltrates. When the photopolymerization initiator 11a and/or the crosslinking agent 11b are in liquid form, for example, each may be applied as a solution as it is, or the solution may be obtained by mixing the photopolymerization initiator 11a and the crosslinking agent 11b. It may also be a solution in which the photopolymerization initiator 11a and the crosslinking agent 11b are dissolved in a solvent. FIG. 2(c) is an embodiment of applying a solution 12 in which a photopolymerization initiator 11a and a crosslinking agent 11b are dissolved in a solvent 13 to one of opposite surfaces of the pressure-sensitive adhesive layer 10.

Figure 2D:
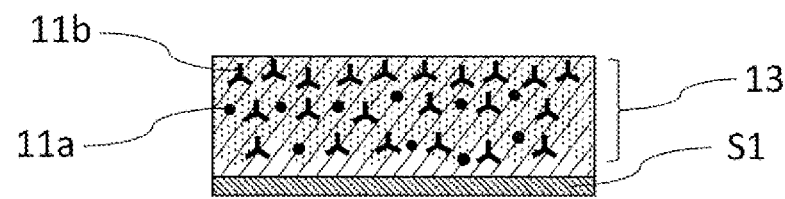
FIG. 2(d) is a schematic view illustrating a solution infiltration step.

On the surface of the pressure-sensitive adhesive layer 10, the photopolymerization initiator 11a and the crosslinking agent 11b in the solution 12 infiltrate into the pressure-sensitive adhesive layer 10 in the thickness direction (solution infiltration step). This state is illustrated in FIG. 2(d). When the solution 12 is a solution in which the photopolymerization initiator 11a and the crosslinking agent 11b are dissolved in the solvent 13, the surface of the pressure-sensitive adhesive layer 10a is swollen by the infiltration of the solvent 13, and the photopolymerization initiator 11a and the crosslinking agent 11b infiltrate into the pressure-sensitive adhesive layer 10 in a dissolved state in the solvent. The photopolymerization initiator 11a and the crosslinking agent 11b become "dissolved" within the pressure-sensitive adhesive layer 10.

In the process of causing the photopolymerization initiator 11a and the crosslinking agent 11b to infiltrate the pressure-sensitive adhesive layer 10a, a concentration gradient can be formed in the thickness direction. Therefore, the concentration of the photopolymerization initiator 11a and the crosslinking agent 11b on a side to which the solution 12 is applied can be higher than on the opposite side. This state is illustrated in FIG. 2(d).

Figure 2E:
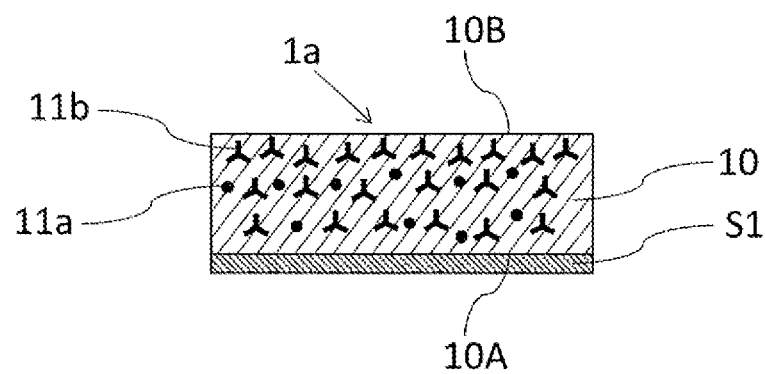
FIG. 2(e) is a schematic view illustrating a drying step.

Thereafter, a pressure-sensitive adhesive sheet 1a as illustrated in FIG. 2(e) can be obtained by drying the pressure-sensitive adhesive layer 10 (drying step). When the solution 12 is a solution in which the photopolymerization initiator 11a and the crosslinking agent 11b are dissolved in the solvent 13, the infiltrated solvent 13 is evaporated by drying step. The pressure-sensitive adhesive layer 10 returns to a state close to that before application by drying the pressure-sensitive adhesive layer 10. Therefore, a change in the physical properties of the pressure-sensitive adhesive layer 10 due to the photopolymerization initiator 11a and the crosslinking agent 11b can be minimized. Once the pressure-sensitive adhesive layer 10 is dried, the infiltration of the photopolymerization initiator 11a and the crosslinking agent 11b into the pressure-sensitive adhesive layer 10 stops, and the concentration gradient of the photopolymerization initiator 11a and the crosslinking agent 11b is fixed.

The pressure-sensitive adhesive layer 10a contains a first photopolymerization initiator and a first crosslinking agent; the pressure-sensitive adhesive layer curing step is preferably curing by reaction of the first photopolymerization initiator and the first crosslinking agent. When the pressure-sensitive adhesive layer 10a contains the first photopolymerization initiator and the first crosslinking agent, after the pressure-sensitive adhesive layer curing step, both or either one of the first photopolymerization initiator and the first crosslinking agent may remain. In this case, the solution 12 may contain only one of the second photopolymerization initiator and the second crosslinking agent. However, it is preferable that the solution 12 contains both the second photopolymerization initiator and the second crosslinking agent.

The solvent is not particularly limited as long as it can dissolve the second photopolymerization initiator and the second crosslinking agent and swell the pressure-sensitive adhesive layer 10, but a non-aqueous solvent is preferred since an aqueous solvent has poor wettability to the pressure-sensitive adhesive layer and the photopolymerization initiator and the crosslinking agent does not easily infiltrate. Examples of the non-aqueous solvent include, but not particularly limited to, esters such as methyl acetate, ethyl acetate, isopropyl acetate, and butyl acetate; aromatic hydrocarbons such as toluene, xylene, and ethylbenzene; ketones such as acetone, methyl ethyl ketone, and methyl isobutyl ketone; alicyclic ketones such as cyclopentanone and cyclohexanone; aliphatic hydrocarbons such as hexane, heptane, and octane; alicyclic hydrocarbons such as cyclohexane; halogenated hydrocarbons such as chloroform, dichloromethane, and 1,2-dichloroethane; ethers such as diethyl ether, dimethoxyethane, tetrahydrofuran, and dioxane; amides such as N,N-dimethylformamide and N,N-dimethylacetamide; nitriles such as acetonitrile, propionitrile, and benzonitrile; and alcohols such as methanol, ethanol, propanol, isopropanol, n-butanol, isobutanol, sec-butanol, and tert-butanol, and esters, aromatic hydrocarbons, ketones, and alcohols are preferable. The solvent can also be used alone or in combination of two or more.

The total concentration of the second photopolymerization initiator and the second crosslinking agent in the solution can be appropriately set according to the desired level difference absorbability, stress relaxation property, and adhesive reliability to be imparted to the pressure-sensitive adhesive layer 10 and for example, can be appropriately selected from the range of 95% by weight or less (e.g., 0.1 to 95% by weight, 0.1 to 90% by weight, 0.1 to 85% by weight, 0.1 to 80% by weight, 0.1 to 70% by weight, 0.1 to 60% by weight, 0.1 to 50% by weight, and 0.1 to 40% by weight) and 0.1% by weight or more (e.g., 0.1 to 95% by weight, 0.2 to 95% by weight, 0.3 to 95% by weight, 0.4 to 95% by weight, 0.5 to 95% by weight, 1 to 95% by weight, 1.5 to 95% by weight, 3 to 95% by weight, and 5 to 95% by weight). If the concentration of the second photopolymerization initiator and the second crosslinking agent in the solution is within this range, the second photopolymerization initiator and the second crosslinking agent can be dissolved, the pressure-sensitive adhesive layer 10 can be sufficiently swollen, and excellent level difference absorbability, stress relaxation property, and adhesive reliability may be imparted to the pressure-sensitive adhesive layer 10.

Specifically, the concentration of the second crosslinking agent in solution can be appropriately set according to the desired curing properties to be imparted to the pressure-sensitive adhesive layer 10 and for example, can be appropriately selected from the range of 95% by weight or less (e.g., 1 to 95% by weight, 1 to 90% by weight, 1 to 85% by weight, 1 to 80% by weight, 1 to 75% by weight, 1 to 70% by weight, 1 to 65% by weight, and 1 to 60% by weight) and 1% by weight or more (e.g., 1 to 95% by weight, 3 to 95% by weight, 4 to 95% by weight, 5 to 95% by weight, 6 to 95% by weight, 7 to 95% by weight, 8 to 95% by weight, 9 to 95% by weight, and 10 to 95% by weight).

In addition, the concentration of the second photopolymerization initiator in the solution can be appropriately set according to the desired curing properties to be imparted to the pressure-sensitive adhesive layer 10, and can be selected from the range of, for example, in terms of the upper limit of 20% by weight or less (e.g., 0.001 to 20% by weight, 0.001 to 19% by weight, 0.001 to 18% by weight, 0.001 to 17% by weight, 0.001 to 16% by weight, 0.001 to 15% by weight, 0.001 to 14% by weight, 0.001 to 13% by weight, and 0.001 to 12% by weight); or in terms of the lower limit, 0.001% or more (e.g., 0.001 to 20% by weight, 0.002 to 20% by weight, 0.003 to 20% by weight, 0.004 to 20% by weight, 0.005 to 20% by weight, 0.006 to 20% by weight, 0.007 to 20% by weight, 0.008 to 20% by weight, 0.009 to 20% by weight, and 0.01 to 20% by weight).

When the pressure-sensitive adhesive layer of the present invention contains a hindered amine light stabilizer (HALS), another hindered amine light stabilizer may be dissolved in the solution 12. When the solution 12 contains an hindered amine light stabilizer in addition to the second photopolymerization initiator and the second crosslinking agent, the pressure-sensitive adhesive layer of the present invention containing the hindered amine light stabilizer can be produced in a single coating, thereby improving production efficiency. The concentration of the hindered amine light stabilizer in the solution can be appropriately set according to the desired storage stability to be imparted to the pressure-sensitive adhesive layer 10, and can be selected from the range of, for example, in terms of the upper limit of 20% by weight or less (e.g., 0.001 to 20% by weight, 0.001 to 19% by weight, 0.001 to 18% by weight, 0.001 to 17% by weight, 0.001 to 16% by weight, 0.001 to 15% by weight, 0.001 to 14% by weight, 0.001 to 13% by weight, and 0.001 to 12% by weight); or in terms of the lower limit, 0.001% or more (e.g., 0.001 to 20% by weight, 0.002 to 20% by weight, 0.003 to 20% by weight, 0.004 to 20% by weight, 0.005 to 20% by weight, 0.006 to 20% by weight, 0.007 to 20% by weight, 0.008 to 20% by weight, 0.009 to 20% by weight, and 0.01 to 20% by weight).

If the concentration of the above second photopolymerization initiator, second crosslinking agent, and hindered amine light stabilizer are each higher than the above range, they may be bled out and, distribution variations may occur from the viewpoint of application uniformity. If the concentration is lower than the above range, more solvent than necessary may be required, resulting in a decrease in adhesive properties due to residual solvent and appearance defects (uneven surface) due to swelling of the pressure-sensitive adhesive more than necessary.

The solution 12 also preferably contains an ultraviolet absorbing agent. When the solution 12 contains an ultraviolet absorbing agent in addition to the second photopolymerization initiator and the second crosslinking agent, a pressure-sensitive adhesive sheet containing the ultraviolet absorbing agent can be produced in a single coating, thereby improving production efficiency. The solution 12 is even more preferable because if a pressure-sensitive adhesive sheet of the present invention containing an ultraviolet absorbing agent is irradiated with ultraviolet rays, the ultraviolet absorbing agent that has absorbed the ultraviolet rays generates heat, which accelerates the curing reaction and thus improves adhesive reliability. The concentration of the ultraviolet absorbing agent in the solution can be appropriately set according to the desired ultraviolet absorption properties to be imparted to the pressure-sensitive adhesive layer 10 and for example, can be selected from the range of, in terms of the upper limit, 50% by weight or less (e.g., 1 to 50% by weight, 1 to 45% by weight, 1 to 40% by weight, 1 to 35% by weight, 1 to 30% by weight, 1 to 25% by weight, 1 to 20% by weight, and 1 to 15% by weight); or in terms of the lower limit, 1% or more (e.g., 1 to 50% by weight, 2 to 50% by weight, 3 to 50% by weight, 4 to 50% by weight, and 5 to 50% by weight).

For the application (coating) to the pressure-sensitive adhesive layer 10 in the solution 12, it is possible to use known coating processes, and examples thereof include a coater, such as a gravure roll coater a reverse roll coater, a kiss roll coater, a dip roll coater, a bar coater, a knife coater, a spray coater, a comma coater, or a direct coater.

The amount of the solution 12 applied to the pressure-sensitive adhesive layer 10 can be appropriately set according to the desired level difference absorbability, stress relaxation properties, and adhesive reliability to be imparted to the pressure-sensitive adhesive layer 10 and for example, can be selected from the range of 1 to 1000 μg/cm$^2$, preferably 1 to 500 μg/cm$^2$, more preferably 1 to 300 μg/cm$^2$, and even more preferably 1 to 100 μg/cm$^2$. If the amount of the solution 12 applied is within this range, the second photopolymerization initiator and the second crosslinking agent can be dissolved, and the level difference absorbability, stress relaxation properties, and adhesive reliability may be sufficiently imparted to the pressure-sensitive adhesive layer 10.

After the solution 12 is applied to the pressure-sensitive adhesive layer 10, it may be allowed to stand to cause the second photopolymerization initiator and the second crosslinking agent to infiltrate, if necessary. The standing time is not particularly limited, and can be appropriately selected, for example, within 15 minutes and can be selected from the range of, for example, 1 second to 10 minutes and preferably 5 seconds to 5 minutes. The standing temperature can be room temperature (approximately 10 to 30° C.). When allowed to stand under the above conditions, the solution can sufficiently infiltrate the pressure-sensitive adhesive layer 10.

A heat-drying temperature in the drying step is preferably 40 to 200° C., more preferably 50 to 180° C., and even more preferably 60 to 170° C. The drying time may be adopted as appropriate and is, for example, 5 seconds to 20 minutes, preferably 5 seconds to 10 minutes, and more preferably 10 seconds to 5 minutes. The pressure-sensitive adhesive layer 10 can be returned to a state close to that before application by drying it under the above conditions.

If necessary, the standing time may be designed to make the second photopolymerization initiator and the second crosslinking agent and the pressure-sensitive adhesive layer more uniform. The standing time is not particularly limited, and can be appropriately selected, for example, within 30 days, and can be appropriately selected, for example, between 1 hour and 15 days and preferably between 24 hours and 10 days. The second photopolymerization initiator and the second crosslinking agent and the pressure-sensitive adhesive layer are stabilized in the pressure-sensitive adhesive layer 10 by allowing it to stand, thereby suppressing variation in characteristic evaluation.

Figure 3:
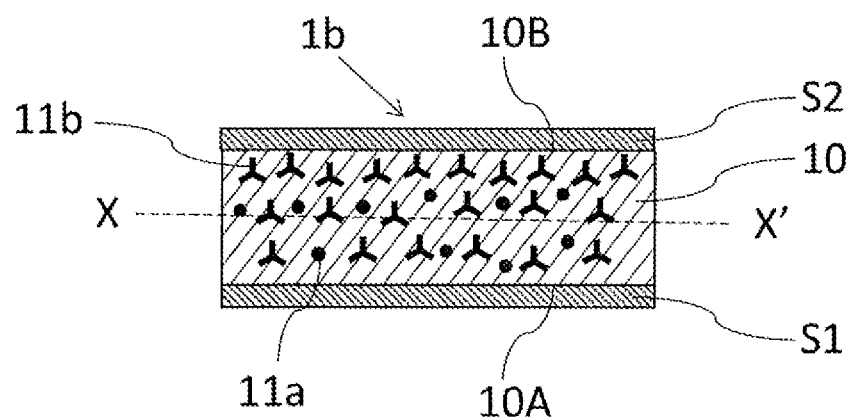
FIG. 3 is a cross-sectional view illustrating one embodiment of the radiation curable pressure-sensitive adhesive sheet according to the present invention produced by the method in FIGS. 2(a)-2(e).

FIG. 3 is a cross-sectional view illustrating one embodiment of the radiation curable pressure-sensitive adhesive sheet according to the present invention produced by the production method of the above second embodiment.

A radiation curable pressure-sensitive adhesive sheet 1b according to one embodiment of the present invention in the FIG. 3 is composed of: a pressure-sensitive adhesive layer 10, a release sheet S1 being laminated onto the other principal surface 10A of the pressure-sensitive adhesive layer 10, and a release sheet S2 being laminated onto opposite principal surface 10B of the pressure-sensitive adhesive layer 10.

In FIG. 3, the pressure-sensitive adhesive layer 10 has two opposite principal surfaces (first principal surface 10A and second principal surface 10B) comprising a base pressure-sensitive adhesive material and may be a single layer or a laminated structure of two or more layers. The pressure-sensitive adhesive layer 10 may be formed through the pressure-sensitive adhesive layer forming step and the pressure-sensitive adhesive layer curing step and is equivalent to the pressure-sensitive adhesive layer 10 in FIG. 2 described above. Therefore, the pressure-sensitive adhesive layer 10 is preferably a cured pressure-sensitive adhesive layer.

The "single layer" of the pressure-sensitive adhesive layer means that it does not have a laminated structure. For example, a formation of a pressure-sensitive adhesive layer comprising a transparent base pressure-sensitive adhesive material with a pressure-sensitive adhesive layer comprising the same transparent base pressure-sensitive adhesive material formed thereon has a laminated structure, not a single layer.

The thickness of the pressure-sensitive adhesive layer 10 is not particularly limited but is typically 5 μm to 500 μm, preferably 5 μm to 400 μm, even more preferably 5 μm to 350 μm. If the thickness of the pressure-sensitive adhesive layer 10 is in this range, the pressure-sensitive adhesive layer 10 can follow such that no bubbles are left in the stepped space and reduce stress strain caused by the stepped space to suppress display unevenness, and has excellent level difference absorbability and stress relaxation properties, which is preferable.

As measured according to JIS K7361, total light transmittance of the entire pressure-sensitive adhesive layer 10 is not particularly limited but is preferably 80% or more and preferably 90% or more. The higher total light transmittance of the pressure-sensitive adhesive layer 10 provides better results. Furthermore, a haze value thereof is preferably 1.5% or less and more preferably 1% or less and 0.8% or less.

The pressure-sensitive adhesive layer 10 contains a photopolymerization initiator 11a and a crosslinking agent 11b. The photopolymerization initiator 11a and the crosslinking agent 11b are preferably dissolved in the pressure-sensitive adhesive layer 10. Herein, "dissolution" means, for example, that the photopolymerization initiator 11a and the crosslinking agent 11b dissolve to such an extent that the transparency of the pressure-sensitive adhesive layer 10 can be maintained, i.e., white turbidity caused by light scattering does not occur. Specifically, the photopolymerization initiator 11a and the crosslinking agent 11b are preferably contained in the pressure-sensitive adhesive layer 10 so that the haze value thereof is 1.5% or less, preferably 1% or less, and 0.8% or less. The present invention encompasses an embodiment in which either one of the photopolymerization initiator 11a and the crosslinking agent 11b is dissolved in the pressure-sensitive adhesive layer 10.

In FIG. 3, the dotted line X-X' is a line dividing the pressure-sensitive adhesive layer 10 into two equal portions in a thickness direction. When the thickness of the pressure-sensitive adhesive layer 10 is not uniform, the dotted line X-X' is a line bisecting the thickness at each point.

The photopolymerization initiator 11a and the crosslinking agent 11b, are formed by causing the photopolymerization initiator 11a and the crosslinking agent 11b to infiltrate the pressure-sensitive adhesive layer 10 through the solution application step, the solution infiltration step, and the drying step, and as illustrated in FIG. 3, a concentration gradient of the photopolymerization initiator 11a and the crosslinking agent 11b may occur in the thickness direction of the pressure-sensitive adhesive layer 10. Therefore, in a case where the single pressure-sensitive adhesive layer 10 is divided into two equal portions in a thickness direction, the concentration of the photopolymerization initiator 11a and the crosslinking agent 11b in the area to which one of the two principal surfaces, the first principal surface 10A, belongs is different from the concentration of the photopolymerization initiator 11a and the crosslinking agent 11b in the area to which the other principal surface, the second principal surface 10B, belongs. The scope of the present invention also includes a case where the photopolymerization initiator 11a and the crosslinking agent 11b are not present in a region where the concentration is lower (the concentration is 0).

The concentration of the photopolymerization initiator 11a and the crosslinking agent 11b in the area to which the first principal surface belongs and the concentration of the photopolymerization initiator 11a and the crosslinking agent 11b in the area to which the second principal surface belongs mean the average concentration in each region if there is also a concentration gradient in each region.

FIG. 3 illustrates an embodiment in which the first principal surface 10A faces the support S1, and the concentration of the photopolymerization initiator 11a and the crosslinking agent 11b in the area to which the second principal surface 10B belongs is higher than the concentration of the photopolymerization initiator 11a and the crosslinking agent 11b in the area to which the first principal surface 10A belongs, and this can be obtained by applying the solution 12 to the second principal surface 10B to cause the photopolymerization initiator 11a and the crosslinking agent 11b into the pressure-sensitive adhesive layer 10 to infiltrate in a dissolved state from the first principal surface 10B over a depth in the thickness direction.

The radiation curable pressure-sensitive adhesive sheet according to the present invention can be used for bonding a transparent optical element to another optical element in an image display device, such as a liquid crystal image display device or an organic EL image display device. Examples of the optical elements include various types of transparent optical elements, such as a polarizing film, a retardation film, and a transparent cover element including a cover glass. The optical elements of the present invention may also include a glass substrate in which a transparent electroconductive layer such as a patterned ITO film is formed.

Figure 4:
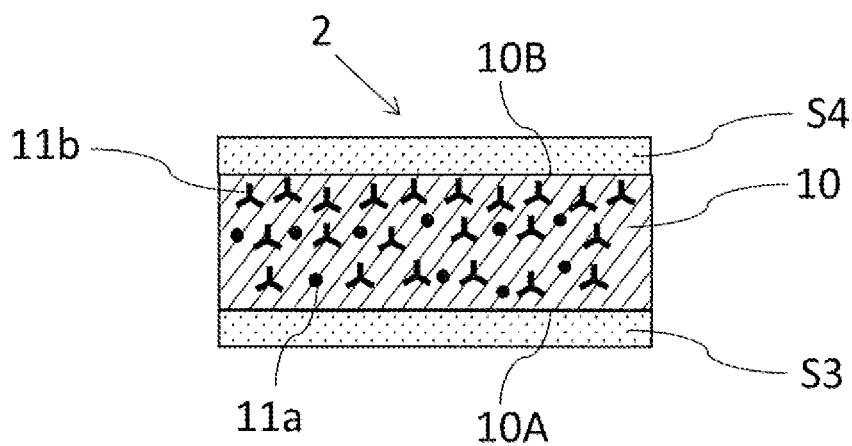
FIG. 4 is a cross-sectional view of an optical element laminate presented as one example of the simplest embodiment using a radiation curable pressure-sensitive adhesive sheet according to the present invention.

FIG. 4 is a cross-sectional view of an optical element laminate presented as one example of the simplest embodiment using a radiation curable pressure-sensitive adhesive sheet of the present invention. Referring to FIG. 4, the optical element laminate 2 is composed of: an optically transparent, first optical element S3; and a second optical element S4 bonded to the first optical element S3 through an optically transparent pressure-sensitive adhesive layer 10. The optical element laminate 2 is obtained by peeling off the supports S1 and S2 from the pressure-sensitive adhesive sheet 1b illustrated in FIG. 3 to laminate them to the first and second optical elements. The transparent, first optical element S3 and second optical element S4 may be composed of: an optical film for use in an optical display device, such as a polarizing film or a retardation film; or a transparent cover element such as a viewing-side cover glass of an optical display device. The first optical element S3 and the second optical element S4 are respectively bonded to the first principal surface 10A and the second principal surface 10B of the pressure-sensitive adhesive layer 10.

Figure 5:
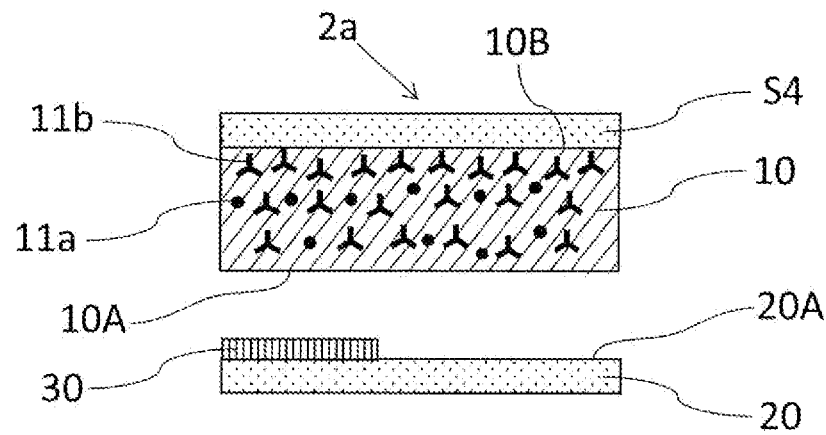
FIGS. 5(a)-5(d) are schematic views illustrating a process for implementing one embodiment of a method for producing an optical element laminate using the radiation curable pressure-sensitive adhesive sheet of the present invention illustrated in FIG. 3.
Figure 5:
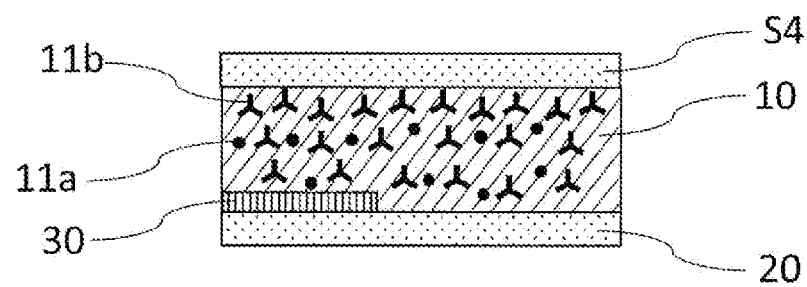
Figure 5:
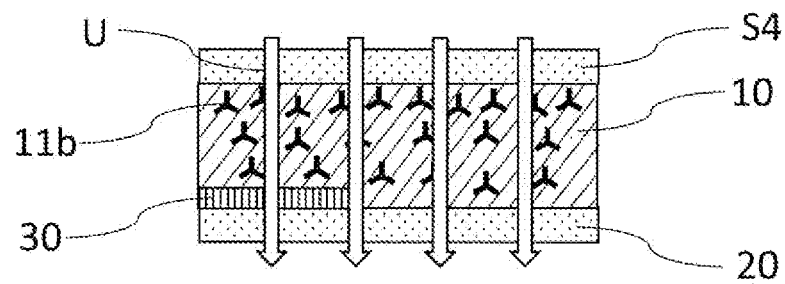
Figure 5:
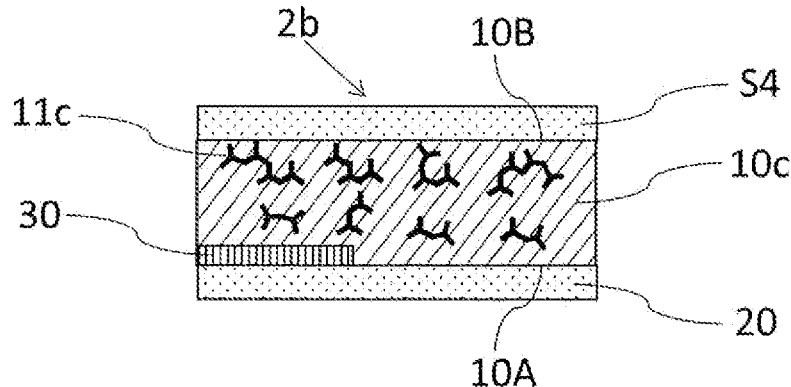

FIGS. 5(a)-5(d) are views schematically illustrating a process for implementing one embodiment of a method for producing an optical element laminate using the radiation curable pressure-sensitive adhesive sheet of the present invention. In the present embodiment, a substrate 20 comprising an optical element laminate 2a and an optical element (hereinafter, sometimes referred to simply as "substrate 20") is used, as illustrated in FIG. 5(a).

In the present embodiment, the optical element laminate 2a is obtained by laminating the optical element S4 onto the principal surface 10B of the pressure-sensitive adhesive sheet 1a produced by the production method according to the second embodiment of the present invention to remove the support S1.

In the optical element laminate 2a in FIG. 5(a), a pressure-sensitive adhesive layer 10 in the present embodiment is cured by the pressure-sensitive adhesive layer curing step, and a photopolymerization initiator 11a and a crosslinking agent 11b are dispersed in a dissolved state. The present invention encompasses an embodiment in which either one of the photopolymerization initiator 11a and the crosslinking agent 11b is dissolved in the pressure-sensitive adhesive layer 10.

In the present embodiment, the optical element laminate 2a has an optical element S4 but the optical element S4 may be the support S2 (release sheet). In the present embodiment, there is a concentration gradient of the photopolymerization initiator 11a and the crosslinking agent 11b in a thickness direction from a principal surface 10B in which the pressure-sensitive adhesive layer 10 is in contact with the optical element S4.

In a substrate 20 in FIG. 5(a), a principal surface 20a bonded to the optical element laminate 2a in the present embodiment have a printed layer 30. The printed layer 30 includes a transparent electroconductive printed layer such as a patterned ITO (Indium Tin Oxide) and a black concealing portion formed in a frame shape in a peripheral edge portion of a transparent cover element. The present invention also encompasses the case where a substrate 20 without the printed layer 30 is used.

Next, the pressure-sensitive adhesive layer 10 of the optical element laminate 2a is bonded to the principal surface 20a of the substrate 20. The bonding can be performed by a known method, for example, under heating and pressurizing conditions using an autoclave. The pressure-sensitive adhesive layer 10 of the optical element laminate 2a is cured by the pressure-sensitive adhesive layer curing step but is in a state before the curing reaction by the photopolymerization initiator 11a (second photopolymerization initiator) and the crosslinking agent 11b (second crosslinking agent) proceeds, so the pressure-sensitive adhesive layer 10 exhibits high fluidity and excellent level difference absorbability and stress relaxation property. Therefore, the pressure-sensitive adhesive layer 10 is bonded so as to fill up a stepped space between the principal surface 20A of the substrate 20 and the printed layer 30. In addition, the pressure-sensitive adhesive layer 10 can reduce sufficiently stress strain caused by the stepped space 30 and can suppress display unevenness when the optical element laminate is used in an image display device.

Next, the pressure-sensitive adhesive layer 10 is cured by reaction of photopolymerization initiator 11a and the crosslinking agent 11b. Examples of the methods of curing the pressure-sensitive adhesive layer 10, include curing the pressure-sensitive adhesive layer 10 by irradiation with the active energy ray. If necessary, the methods may further include heating and drying. Examples of the active energy ray include ionizing radiations such as an α-ray, a β-ray, a γ-ray, a neutron ray, an electron ray, and ultraviolet rays, and particularly, the ultraviolet rays are preferable.

The conditions for curing the pressure-sensitive adhesive layer 10, for example, the heating temperature and time or the irradiation dose of the active energy rays, may be set appropriately so as to exhibit high elastic modulus and excellent adhesive reliability.

FIG. 5(c) is an embodiment in which the pressure-sensitive adhesive layer 10 is cured by irradiating the pressure-sensitive adhesive layer 10 with ultraviolet rays U. The irradiation with the ultraviolet rays U decomposes the photopolymerization initiator 11a and generates radicals, ions, or the like to initiate polymerization and crosslinking reaction of the crosslinking agent 11b. The ultraviolet rays may be irradiated through the optical element S4. When the optical element S4 is a support S2 (release sheet), the optical element S4 may be laminated after ultraviolet rays are irradiated through the support S2 to release the support S2. Moreover, the ultraviolet rays may be irradiated from the substrate 20 (optical element) side. FIG. 5(c) is an embodiment in which the pressure-sensitive adhesive layer 10 is irradiated with ultraviolet rays U through the optical element S4.

As illustrated in FIG. 5(d), an optical element laminate 2b is obtained by curing the pressure-sensitive adhesive layer 10. In FIG. 5(d), 10c is a pressure-sensitive adhesive layer in which the pressure-sensitive adhesive layer 10 is cured.

The crosslinking agent 11b is crosslinked and polymerized to form a crosslinked structure 11c by curing the pressure-sensitive adhesive layer 10, thereby forming a pressure-sensitive adhesive layer 10c. The pressure-sensitive adhesive layer 10c has an improved elastic modulus and improved adhesive reliability to the substrate 20. Therefore, the pressure-sensitive adhesive layer 10c suppresses the generation of gas such as carbon dioxide due to heating of the substrate 20 (plastic film) and prevents the formation of bubbles.

In the embodiment of FIG. 5(d), the crosslinking density on a side of the principal surface 10B, in which the pressure-sensitive adhesive layer 10c is in contact with the optical element S4, is higher than the principal surface 10A on the opposite side. This configuration is preferable in that its bendability can be improved, for example, when the optical element laminate 2b is used as a flexible image display device bending the side of the principal surface 10B to the outside.

In other words, when a flexible display is bent, tensile stress is generally applied to the outside while compressive stress is applied to the inside, with the outside stress being greater than the inside stress. Therefore, durability against bending can be improved by disposing the principal surface 10B of the pressure-sensitive adhesive layer 10c on the outside of the flexible display when it is bent.

The optical element laminate 2b in the present embodiment has, for example, the following configuration.

The optical element laminate 2b includes a substrate 20 comprising an optical element and a pressure-sensitive adhesive layer 10c, wherein:
  the pressure-sensitive adhesive layer 10c is laminated on a principal surface of a substrate 20 comprising the optical element;
  the pressure-sensitive adhesive layer 10c is a single layer comprising a transparent base pressure-sensitive adhesive material cured by a reaction between the second polymerization initiator 11a and the second crosslinking agent 11b, and having two opposite principal surfaces; and in a case where the single pressure-sensitive adhesive layer is divided into two equal portions in a thickness direction, the density of a crosslinking structure 11c in an area to which one of the two principal surfaces, a first principal surface 10A, belongs is different from the density of the crosslinking structure 11c in an area to which the other principal surface, a second principal surface 10B, belongs.

In the present embodiment, the pressure-sensitive adhesive layer 10c is laminated so as to fill up a stepped space between the principal surface 20A of the substrate 20 and the printed layer 30.

EXAMPLES

The present invention will be described in more detail below based on Examples, but the present invention is not limited to these Examples.

(Preparation of Pressure-Sensitive Adhesive Sheet A)

To a monomer mixture composed of 57 parts by weight of butyl acrylate (BA), 23 parts by weight of 4-hydroxybutyl acrylate (4HBA), 8 parts by weight of 2-hydroxyethyl acrylate (HEA), and 12 parts by weight of cyclohexyl acrylate (CHA) was incorporated 0.035 parts by weight of a photopolymerization initiator (trade name "Omnirad 184", manufactured by IGM Resins B.V.) and 0.035 parts by weight of a photopolymerization initiator (trade name "Omnirad 651", manufactured by IGM Resins B.V.). The resultant was then irradiated with ultraviolet rays until the viscosity thereof (measuring conditions: a BH viscometer No. 5 rotor; 10 rpm; and measuring temperature: 30° C.) turned to about 20 Pa-s to yield a prepolymer composition in which the monomer components were partially polymerized.

Next, to the prepolymer composition was added 0.03 parts by weight of dipentaerythritol hexaacrylate (DPHA) and mixed to yield an acrylic pressure-sensitive adhesive composition. The above acrylic pressure-sensitive adhesive composition was applied onto a release-treated surface of a release film (trade name: "MRF #38", manufactured by Mitsubishi Plastics, Inc.) such that the thickness thereof after being formation of a pressure-sensitive adhesive layer becomes 250 μm to form a pressure-sensitive adhesive composition layer. Then, a release film (trade name: "MRN #38", manufactured by Mitsubishi Plastics, Inc.) was laminated onto a surface of the pressure-sensitive adhesive composition layer. Thereafter, the pressure-sensitive adhesive composition layer was light-cured by performing irradiation with ultraviolet rays under conditions of an illuminance of 5 mW/cm$^2$ and a light quantity of 1500 mJ/cm$^2$ to form a pressure-sensitive adhesive sheet A.

Example 1

A release film was removed from one of opposite principal surfaces (referred to as "first surface") of the pressure-sensitive adhesive sheet A, and the exposed first surface was coated with an ethyl acetate solution prepared by diluting trimethylolpropane triacrylate (TMPTA) to a concentration of 80% by weight, a photopolymerization initiator (Omnirad 369E, manufactured by IGM Resins B.V.) to a concentration of 0.5% by weight by using a Wire Wound Rod type, #12 bar coater, manufactured by RD Specialties (target wet applying thickness: 27 μm). After application, the pressure-sensitive adhesive sheet A was heated and dried in an oven at 110° C. for 2 minutes, and then the solvent was volatilized and eliminated to yield a pressure-sensitive adhesive sheet A containing the pressure-sensitive adhesive layer in which TMPTA was dissolved.

The chemical structural formula of a photopolymerization initiator (Omnirad 369E, 2-benzyl-2-dimethylamino-1-(4-morpholinophenyl)-butanone-1) was drawn using ChemDraw 19.0, and the calculated pKa determined using a computational module Chemoinformatics platform MOSES (Molecular Networks GmbH, Erlangen, Germany) was 7.68.

Example 2

A pressure-sensitive adhesive sheet A containing a pressure-sensitive adhesive layer in which TMPTA was dissolved was obtained in the same manner as in Example 1, except that the concentration of the photopolymerization initiator (Omnirad 369E, manufactured by IGM Resins B.V.) in the ethyl acetate solution was changed to 1.0% by weight.

Example 3

A pressure-sensitive adhesive sheet A containing a pressure-sensitive adhesive layer in which TMPTA was dissolved was obtained in the same manner as in Example 1, except that the concentration of the photopolymerization initiator (Omnirad 369E, manufactured by IGM Resins B.V.) in the ethyl acetate solution was changed to 2.0% by weight.

Example 4

A pressure-sensitive adhesive sheet A containing a pressure-sensitive adhesive layer in which TMPTA was dissolved was obtained in the same manner as in Example 1, except that the concentration of the photopolymerization initiator in the ethyl acetate solution was changed to 0.025% by weight using a photopolymerization initiator (Omnirad 907, manufactured by IGM Resins B.V.).

The chemical structural formula of the photopolymerization initiator (Omnirad 907, 2-methyl-1-[4-(methylthio)phenyl]-2-morpholinopropan-1-one) was drawn using ChemDraw 19.0, and the calculated pKa determined using a computational module Chemoinformatics platform MOSES (Molecular Networks GmbH, Erlangen, Germany) was 5.56.

Example 5

A pressure-sensitive adhesive sheet A containing a pressure-sensitive adhesive layer in which TMPTA was dissolved was obtained in the same manner as in Example 1, except that the concentration of the photopolymerization initiator in the ethyl acetate solution was changed to 1.0% by weight using a photopolymerization initiator (Omnirad 907, manufactured by IGM Resins B.V.).

Example 6

A pressure-sensitive adhesive sheet A containing a pressure-sensitive adhesive layer in which TMPTA was dissolved was obtained in the same manner as in Example 1, except that the concentration of the photopolymerization initiator in the ethyl acetate solution was changed to 2.0% by weight using a photopolymerization initiator (Omnirad 907, manufactured by IGM Resins B.V.).

Example 7

A pressure-sensitive adhesive sheet A containing a pressure-sensitive adhesive layer in which TMPTA was dissolved was obtained in the same manner as in Example 1, except that the concentration of the photopolymerization initiator in the ethyl acetate solution was changed to 4.0% by weight using a photopolymerization initiator (Omnirad 907, manufactured by IGM Resins B.V.).

Example 8

A pressure-sensitive adhesive sheet A containing a pressure-sensitive adhesive layer in which TMPTA was dissolved was obtained in the same manner as in Example 1, except that the concentration of the photopolymerization initiator in the ethyl acetate solution was changed to 8.0% by weight using a photopolymerization initiator (Omnirad 907, manufactured by IGM Resins B.V.).

Example 9

A pressure-sensitive adhesive sheet A containing a pressure-sensitive adhesive layer in which TMPTA was dissolved was obtained in the same manner as in Example 1, except that the concentration of the photopolymerization initiator (Omnirad 369E, manufactured by IGM Resins B.V.) in a toluene solution was changed to 2.0% by weight using toluene as a solvent.

Example 10

A pressure-sensitive adhesive sheet A containing a pressure-sensitive adhesive layer in which TMPTA was dissolved was obtained in the same manner as in Example 1, except that a photopolymerization initiator (Omnirad 907, manufactured by IGM Resins B. V.) was used, and an ethyl acetate solution prepared by diluting the photopolymerization initiator to a concentration of 1.0% by weight was applied by using a Wire Wound Rod type, #3 bar coater, manufactured by RD Specialties (target wet applying thickness: 7 μm).

Example 11

A pressure-sensitive adhesive sheet A containing a pressure-sensitive adhesive layer in which TMPTA was dissolved was obtained in the same manner as in Example 1, except that a photopolymerization initiator (Omnirad 907, manufactured by IGM Resins B. V.) was used, and an ethyl acetate solution prepared by diluting the photopolymerization initiator to a concentration of 1.0% by weight was applied by using a Wire Wound Rod type, #20 bar coater, manufactured by RD Specialties (target wet applying thickness: 46 μm).

Example 12

A pressure-sensitive adhesive sheet A containing a pressure-sensitive adhesive layer in which trimethylolpropane triacrylate (TMPTA) was dissolved was obtained in the same manner as in Example 1, except that an ethyl acetate solution prepared by diluting TMPTA to a concentration of 80% by weight, a photopolymerization initiator (Omnirad 184, manufactured by IGM Resins B.V.) to a concentration of 2.0% by weight, and a hindered amine light stabilizer (Tinuvin 770DF, manufactured by BASF) to a concentration of 0.2% by weight was applied thereto.

The chemical structural formula of the photopolymerization initiator (Omnirad 184, 1-hydroxycyclohexyl phenyl ketone) was drawn using ChemDraw 19.0, and the calculated pKa determined using a computational module Chemoinformatics platform MOSES (Molecular Networks GmbH, Erlangen, Germany) was 12.8.

The chemical structural formula of the hindered amine light stabilizer (Tinuvin 770DF, bis(2,2,6,6-tetramethyl-4-piperidyl) sebacate) was drawn using ChemDraw 19.0, and the calculated pKa determined using a computational module Chemoinformatics platform MOSES (Molecular Networks GmbH, Erlangen, Germany) was 9.47.

Example 13

A pressure-sensitive adhesive sheet A containing a pressure-sensitive adhesive layer in which TMPTA was dissolved was obtained in the same manner as in Example 12, except that the concentration of the hindered amine light stabilizer in the ethyl acetate solution was changed to 0.5% by weight using the hindered amine light stabilizer (Tinuvin 770DF, manufactured by BASF).

Example 14

A pressure-sensitive adhesive sheet A containing a pressure-sensitive adhesive layer in which TMPTA was dissolved was obtained in the same manner as in Example 12, except that the concentration of the hindered amine light stabilizer in the ethyl acetate solution was changed to 2.0% by weight using a hindered amine light stabilizer (Tinuvin 770DF, manufactured by BASF).

Comparative Example 1

A pressure-sensitive adhesive sheet A containing a pressure-sensitive adhesive layer in which TMPTA was dissolved was obtained in the same manner as in Example 1, except that the concentration of the photopolymerization initiator in the ethyl acetate solution was changed to 1.0% by weight using a photopolymerization initiator (Omnirad 184, manufactured by IGM Resins B.V.).

Comparative Example 2

A pressure-sensitive adhesive sheet A containing a pressure-sensitive adhesive layer in which TMPTA was dissolved was obtained in the same manner as in Example 1, except that the concentration of the photopolymerization initiator in the ethyl acetate solution was changed to 2.0% by weight using a photopolymerization initiator (Omnirad 184, manufactured by IGM Resins B.V.).

Comparative Example 3

A pressure-sensitive adhesive sheet A containing a pressure-sensitive adhesive layer in which TMPTA was dissolved was obtained in the same manner as in Example 1, except that the concentration of the photopolymerization initiator in the ethyl acetate solution was changed to 4.0% by weight using a photopolymerization initiator (Omnirad 184, manufactured by IGM Resins B.V.).

Comparative Example 4

A pressure-sensitive adhesive sheet A containing a pressure-sensitive adhesive layer in which TMPTA was dissolved was obtained in the same manner as in Example 1, except that the concentration of the photopolymerization initiator in the ethyl acerate solution was changed to 1.0% by weight using a photopolymerization initiator (Omnirad 127D, manufactured by IGM Resins B.V.).

The chemical structural formula of the photopolymerization initiator (Omnirad 127D, 2-hydroxy-1-(4-(4-(2-hydroxy-2-methylpropionyl) benzyl)phenyl)-2-methylpropan-1-one) was drawn using ChemDraw 19.0, and the calculated pKa determined using a computational module Chemoinformatics platform MOSES (Molecular Networks GmbH, Erlangen, Germany) was 12.84.

Comparative Example 5

A pressure-sensitive adhesive sheet A containing a pressure-sensitive adhesive layer in which TMPTA was dissolved was obtained in the same manner as in Example 1, except that the concentration of the photopolymerization initiator in the ethyl acerate solution was changed to 2.0% by weight using a photopolymerization initiator (Omnirad 127D, manufactured by IGM Resins B.V.).

Comparative Example 6

A pressure-sensitive adhesive sheet A containing a pressure-sensitive adhesive layer in which TMPTA was dissolved was obtained in the same manner as in Example 1, except that the concentration of the photopolymerization initiator in the ethyl acerate solution was changed to 4.0% by weight using a photopolymerization initiator (Omnirad 127D, manufactured by IGM Resins B.V.).

Comparative Example 7

A pressure-sensitive adhesive sheet A containing a pressure-sensitive adhesive layer in which TMPTA was dissolved was obtained in the same manner as in Example 12, except that the concentration of the hindered amine light stabilizer in the ethyl acetate solution was changed to 0.5% by weight using a hindered amine light stabilizer (Tinuvin 123, manufactured by BASF).

The chemical structural formula of the hindered amine light stabilizer (Tinuvin 123, bis(2,2,6,6-tetramethyl-1(octyloxy)-4-piperidinyl) ester) was drawn using ChemDraw 19.0, and the calculated pKa determined using a computational module Chemoinformatics platform MOSES (Molecular Networks GmbH, Erlangen, Germany) was 4.94.

<Evaluation of Residual Stress Change Rate>

The release films of the pressure-sensitive adhesive sheets obtained in Examples 1 to 14 and Comparative Examples 1 to 7 were each peeled off to prepare test pieces having a width of 40 mm and a length of 20 mm. The test pieces were rolled back in the longitudinal direction to prepare cylindrical test pieces (the length of each cylinder is 40 mm). At this time, the test pieces were prepared so as not to have voids inside. Both ends of each cylinder in the longitudinal direction were held with chucks of an autograph (AG-X plus 200N, manufactured by Shimadzu Corporation) by 10 mm (the distance between the chucks is 20 mm). The test pieces were each pulled by the autograph until the distance between the chucks reached 80 mm, and held for 300 seconds while the distance between the chucks remained at 80 mm. The residual stress [N/cm$^2$] was obtained by the formula [stress after holding for 300 seconds/length×glue thickness].

The residual stress at the initial stage of production of the pressure-sensitive adhesive sheet and the residual stress of the pressure-sensitive adhesive sheet after storage in a thermostatic bath at 50° C. for 4 weeks were determined, and the rate (%) of change in residual stress was calculated from the following equation.

Residual stress change rate (%)=(residual stress after storage at 50° C. for 4 weeks−initial residual stress)/(initial residual stress)×100

The pressure-sensitive adhesive sheets were evaluated for the storage stability based on the following criteria. Results are shown in Table 1.

⊙: Residual stress change rate of 30% or less
○: Residual stress change rate of more than 30% and not more than 50%
Δ: Residual stress change rate of more than 50% and not more than 70%
X: Residual stress change rate of more than 70% and not more than 100%
XX: Residual stress change rate of more than 100%

TABLE 1

| Example | Residual stress change rate (%) | Storage stability | Comparative Example | Residual stress change rate (%) | Storage stability |
|---|---|---|---|---|---|
| 1 | 26.5 | ⊙ | 1 | 117.2 | XX |
| 2 | 17.3 | ⊙ | 2 | 106.6 | XX |
| 3 | 17.3 | ⊙ | 3 | 103.9 | XX |
| 4 | 28.3 | ⊙ | 4 | 98.1 | X |
| 5 | 44.6 | ○ | 5 | 82.5 | X |
| 6 | 37.0 | ○ | 6 | 74.3 | X |
| 7 | 24.7 | ⊙ | 7 | 124.6 | XX |
| 8 | 21.2 | ⊙ | | | |
| 9 | 17.3 | ⊙ | | | |
| 10 | 45.9 | ○ | | | |
| 11 | 42.4 | ○ | | | |
| 12 | 24.6 | ⊙ | | | |
| 13 | 58.3 | Δ | | | |
| 14 | 49.7 | ○ | | | |

Variations of the present invention will be supplementally described below.

[Supplement 1]

A radiation curable pressure-sensitive adhesive sheet having a pressure-sensitive adhesive layer that is cured by irradiation with radiation, wherein:

the pressure-sensitive adhesive layer contains a photopolymerization initiator and a crosslinking agent;

the curing by irradiation with radiation is curing by a reaction between the photopolymerization initiator and the crosslinking agent; and when the pressure-sensitive adhesive layer is stored at 50° C. for 4 weeks, a rate of change in residual stress (N/cm$^2$) expressed by the following equation is 70% or less:

residual stress change rate (%)=(residual stress after storage at 50° C. for 4 weeks−initial residual stress)/(initial residual stress)×100.

[Supplement 2]

The radiation curable pressure-sensitive adhesive sheet according to supplement 1, having a pressure-sensitive adhesive layer that is cured by irradiation with radiation, wherein:

the pressure-sensitive adhesive layer is cured by a reaction between a first photopolymerization initiator and a first crosslinking agent;

the pressure-sensitive adhesive layer contains a second photopolymerization initiator and a second crosslinking agent;

the curing by irradiation with radiation is curing by a reaction between the second photopolymerization initiator and the second crosslinking agent; and the second photopolymerization initiator has a pKa of 5 to 12.7.

[Supplement 3]

The radiation curable pressure-sensitive adhesive sheet according to supplement 2, wherein the second photopolymerization initiator and the second crosslinking agent are dissolved in the pressure-sensitive adhesive layer.

[Supplement 4]

The radiation curable pressure-sensitive adhesive sheet according to supplement 2 or 3, wherein the second photopolymerization initiator is the same as the first photopolymerization initiator.

[Supplement 5]

The radiation curable pressure-sensitive adhesive sheet according to any one of supplements 1 to 4, wherein:

the pressure-sensitive adhesive layer is a single layer having two opposite principal surfaces;

in a case where the single pressure-sensitive adhesive layer is divided into two equal portions in a thickness direction, a concentration of the photopolymerization initiator (second photopolymerization initiator) and the crosslinking agent (second crosslinking agent) in an area to which one of the two principal surfaces, a first principal surface, belongs is different from a concentration of the photopolymerization initiator (second photopolymerization initiator) and the crosslinking agent (second crosslinking agent) in an area to which the other principal surface, a second principal surface, belongs.

[Supplement 6]

The radiation curable pressure-sensitive adhesive sheet according to supplement 5, wherein the single pressure-sensitive adhesive layer has a concentration gradient of the photopolymerization initiator (second photopolymerization initiator) and the crosslinking agent (second crosslinking agent) in the thickness direction.

[Supplement 7]

The radiation curable pressure-sensitive adhesive sheet according to any one of supplements 1 to 6, wherein the pressure-sensitive adhesive layer has a thickness of 5 to 500 μm.

[Supplement 8]

A method for producing the radiation curable pressure-sensitive adhesive sheet according to any one of supplements 1 to 7, comprising:

forming a pressure-sensitive adhesive layer formed of a base pressure-sensitive adhesive material on a support;

curing the pressure-sensitive adhesive layer;

providing a solution of a photopolymerization initiator (second photopolymerization initiator) and a crosslinking agent (second crosslinking agent);

applying the solution to one of opposite surfaces of the cured pressure-sensitive adhesive layer;

causing the photopolymerization initiator (second photopolymerization initiator) and the crosslinking agent (second crosslinking agent) contained in the solution to infiltrate from the one surface in a thickness direction of the pressure-sensitive adhesive layer; and drying the pressure-sensitive adhesive layer.

[Supplement 9]

The method for producing the radiation curable pressure-sensitive adhesive sheet according to supplement 8, wherein the solution containing the photopolymerization initiator (second photopolymerization initiator) and the crosslinking agent (second crosslinking agent) is a solution in which the photopolymerization initiator and the crosslinking agent are dissolved in a solvent, and the method comprises drying the pressure-sensitive adhesive layer to evaporate the solvent of the solution.

[Supplement 10]

The method for producing the radiation curable pressure-sensitive adhesive sheet according to supplement 8 or 9, wherein the support is a release sheet.

[Supplement 11]

The method for producing a radiation curable pressure-sensitive adhesive sheet according to any one of supplements 8 to 10 further comprising laminating a release sheet onto a surface of the pressure-sensitive adhesive layer on a side opposite to the support.

[Supplement 12]

An optical element laminate comprising:

a substrate comprising an optical element; and a pressure-sensitive adhesive layer, wherein:

the pressure-sensitive adhesive layer is laminated on a principal surface of the substrate comprising an optical element; and the pressure-sensitive adhesive layer is a cured product of the pressure-sensitive adhesive layer of the radiation curable pressure-sensitive adhesive sheet according to any one of supplements 1 to 7.

[Supplement 13]

The optical element laminate according to supplement 12, wherein:

the principal surface of the substrate comprising an optical element has a printed layer; and the pressure-sensitive adhesive layer is laminated so as to fill up a stepped space between the principal surface of the substrate comprising an optical element and the printed layer.

[Supplement 14]

The optical element laminate according to supplement 12 or 13, wherein the cured product is a cured product obtained by reaction of the polymerization initiator and a crosslinking agent.

INDUSTRIAL APPLICABILITY

A radiation curable pressure-sensitive adhesive sheet of the present invention is useful in a pressure-sensitive adhesive sheet having a transparent pressure-sensitive adhesive layer that can be used for bonding a transparent optical element to another optical element.

REFERENCE SIGNS LIST

1 Radiation curable pressure-sensitive adhesive sheet
1a Radiation curable pressure-sensitive adhesive sheet
1b Radiation curable pressure-sensitive adhesive sheet
2 Optical element laminate
2a Optical element laminate
2b Optical element laminate
10a Pressure-sensitive adhesive layer (before curing)
10 Pressure-sensitive adhesive layer (after curing)
10c Pressure-sensitive adhesive layer (after curing)

S1, S2 Support (release sheet)
U Ultraviolet ray
11a Photopolymerization initiator
11b Crosslinking agent
11c Crosslinked structure
12 Solution of photopolymerization initiator and crosslinking agent
13 Solvent
S3, S4 Optical element
20 Substrate (optical element)
30 Printed layer

The invention claimed is:

1. A pressure-sensitive adhesive sheet, comprising:
i) a pressure-sensitive adhesive layer, the pressure-sensitive adhesive layer comprising, in polymerized form, a base monomer, a first photopolymerization initiator and a first crosslinking agent, the pressure-sensitive adhesive layer having two opposite principal surfaces: first principal surface and second principal surface;
ii) a second photopolymerization initiator;
iii) a second crosslinking agent, and
iv) a release sheet laminated onto the first principal surface of the pressure-sensitive adhesive layer, wherein:
when the pressure-sensitive adhesive layer is stored at 50° C. for 4 weeks, a rate of change in residual stress (N/cm$^2$) expressed by the following equation is 70% or less:

residual stress change rate (%)=(residual stress after storage at 50° C. for 4 weeks−initial residual stress)/(initial residual stress)×100, and the first crosslinking agent forms a crosslinked structure in the pressure-sensitive adhesive layer, while the second crosslinking agent is an unreacted crosslinking agent and is present within the pressure-sensitive adhesive layer and the second photopolymerization initiator is an unreacted photopolymerization initiator and is present within the pressure-sensitive adhesive layer.

2. The pressure-sensitive adhesive sheet according to claim 1, wherein
the second photopolymerization initiator has a pKa of 5 to 12.7.

3. The pressure-sensitive adhesive sheet according to claim 1, wherein the second photopolymerization initiator and the second crosslinking agent are dissolved in the pressure-sensitive adhesive layer.

4. The pressure-sensitive adhesive sheet according to claim 1, wherein the second photopolymerization initiator and the first photopolymerization initiator are the same type of a photopolymerization initiator.

5. The pressure-sensitive adhesive sheet according to claim 1, wherein:
the pressure-sensitive adhesive layer is a single layer having the two opposite principal surfaces;
in a case where the single pressure-sensitive adhesive layer is divided into two equal portions in a thickness direction,
a concentration of the second photopolymerization initiator and the second crosslinking agent in an area to which one of the two opposite principal surfaces, the first principal surface, belongs is different from a concentration of the second photopolymerization initiator and the second crosslinking agent in an area to which the other principal surface, the second principal surface, belongs.

6. The pressure-sensitive adhesive sheet according to claim 5, wherein the single pressure-sensitive adhesive layer has a concentration gradient of the second photopolymerization initiator and the second crosslinking agent in the thickness direction.

7. The pressure-sensitive adhesive sheet according to claim 1, wherein the pressure-sensitive adhesive layer has a thickness of 5 to 500 µm.

8. A method for producing the pressure-sensitive adhesive sheet according to claim 1, the method comprising:
forming a pressure-sensitive adhesive layer formed of a base pressure-sensitive adhesive material on a support;
curing the pressure-sensitive adhesive layer;
providing a solution of a second photopolymerization initiator and a second crosslinking agent;
applying the solution to one of opposite surfaces of the cured pressure-sensitive adhesive layer;
causing the second photopolymerization initiator and the second crosslinking agent contained in the solution to infiltrate from the one surface in a thickness direction of the pressure-sensitive adhesive layer; and
drying the pressure-sensitive adhesive layer.

9. The method for producing the pressure-sensitive adhesive sheet according to claim 8, wherein
the solution containing the second photopolymerization initiator and the second crosslinking agent is a solution in which the second photopolymerization initiator and the second crosslinking agent are dissolved in a solvent, and
the method comprises drying the pressure-sensitive adhesive layer to evaporate the solvent of the solution.

10. The method for producing the pressure-sensitive adhesive sheet according to claim 8, wherein the support is a release sheet.

11. The method for producing a pressure-sensitive adhesive sheet according to claim 8, further comprising laminating a release sheet onto a surface of the pressure-sensitive adhesive layer on a side opposite to the support.

12. An optical element laminate comprising:
a substrate comprising an optical element; and
a pressure-sensitive adhesive layer,
wherein:
the pressure-sensitive adhesive layer is laminated on a principal surface of the substrate comprising an optical element; and
the pressure-sensitive adhesive layer is a cured product of the pressure-sensitive adhesive layer of the pressure-sensitive adhesive sheet according to claim 1.

13. The optical element laminate according to claim 12, wherein:
the principal surface of the substrate comprising an optical element has a printed layer; and
the pressure-sensitive adhesive layer is laminated so as to fill up a stepped space between the principal surface of the substrate comprising an optical element and the printed layer.

14. The optical element laminate according to claim 12, wherein the cured product is a cured product obtained by reaction of the polymerization initiator and a crosslinking agent.

* * * * *